(12) United States Patent
Kominami et al.

(10) Patent No.: US 11,958,678 B2
(45) Date of Patent: Apr. 16, 2024

(54) STIRRING DEVICE FOR AEROSOL CONTAINER, DISCHARGE APPARATUS AND DISCHARGE METHOD FOR MOVING VEHICLE, TEMPERATURE ADJUSTING DEVICE, TEMPERATURE HOLDING DEVICE, TEMPERATURE ADJUSTING METHOD AND TEMPERATURE HOLDING METHOD FOR AEROSOL CONTAINER

(71) Applicant: TOYO SEIKAN CO., LTD., Tokyo (JP)

(72) Inventors: Atsushi Kominami, Yokohama (JP); Souji Araki, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 31 days.

(21) Appl. No.: 17/629,463

(22) PCT Filed: Jul. 7, 2020

(86) PCT No.: PCT/JP2020/026515
§ 371 (c)(1),
(2) Date: Jan. 24, 2022

(87) PCT Pub. No.: WO2021/014960
PCT Pub. Date: Jan. 28, 2021

(65) Prior Publication Data
US 2022/0242655 A1    Aug. 4, 2022

(30) Foreign Application Priority Data

Jul. 23, 2019 (JP) .................................. 2019-135199
Jul. 23, 2019 (JP) .................................. 2019-135203
Nov. 13, 2019 (JP) .................................. 2019-205376

(51) Int. Cl.
*B65D 83/72* (2006.01)
*B64C 39/02* (2023.01)
*B64U 101/00* (2023.01)

(52) U.S. Cl.
CPC ............ *B65D 83/72* (2013.01); *B64C 39/024* (2013.01); *B64U 2101/00* (2023.01)

(58) Field of Classification Search
CPC .... B65D 83/72; B65D 83/752; B65D 83/262; B65D 83/386; B64C 39/024;
(Continued)

(56) References Cited

U.S. PATENT DOCUMENTS 3,576,279 A * 4/1971 Ayres ..................... B65D 83/72
165/73
3,578,945 A * 5/1971 Ayres ..................... B65D 83/72
392/475

(Continued)

FOREIGN PATENT DOCUMENTS

CN          103209728 A     7/2013
CN          107215456 A     9/2017
(Continued)

OTHER PUBLICATIONS

Office Action in CN Application No. 202080053386.6 dated Apr. 29, 2023, 19 pages.
(Continued)

*Primary Examiner* — Vishal Pancholi
(74) *Attorney, Agent, or Firm* — MARSHALL, GERSTEIN & BORUN LLP

(57) ABSTRACT

A discharge apparatus and a discharge method for a moving vehicle are provided in which a content in an aerosol container can be stirred in a state where the aerosol container is mounted on the moving vehicle, so that the content of a constant quality can be discharged. The discharge apparatus
(Continued)

Figure 3A:
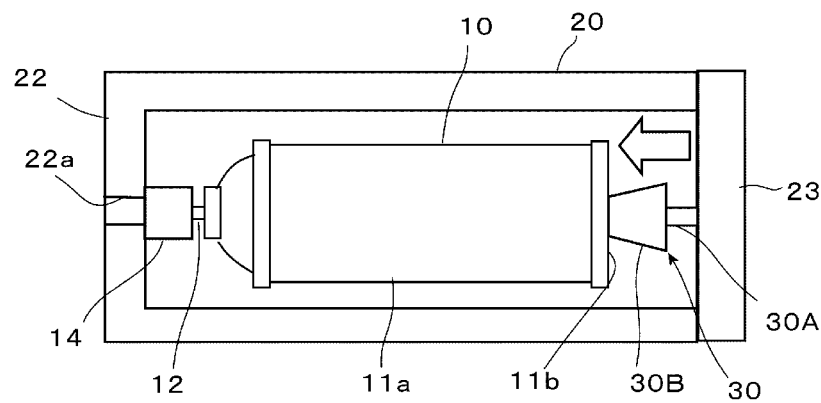

for a moving vehicle, which is provided with an aerosol container mounted on the moving vehicle and discharges the content in the aerosol container, is characterized by including a stirring means that stirs the content by causing the aerosol container to rotate, reciprocate, swing, vibrate, or otherwise move with respect to the moving vehicle.

8 Claims, 19 Drawing Sheets

(58) Field of Classification Search
CPC .... B64U 2101/00; B64U 10/10; B64U 50/19; B05B 15/25; B05B 12/10; B64D 1/18; G05D 23/24

See application file for complete search history.

(56) References Cited

U.S. PATENT DOCUMENTS

| | | | | |
|---|---|---|---|---|
| 5,785,214 | A * | 7/1998 | Smrt | B65D 83/203 222/402.1 |
| 6,062,443 | A * | 5/2000 | Smrt | B65D 83/203 222/608 |
| 2002/0074349 | A1* | 6/2002 | Michaels | A45D 27/02 219/214 |
| 2003/0029931 | A1 | 2/2003 | Zanma et al. | |
| 2003/0132254 | A1 | 7/2003 | Giangreco | |
| 2011/0024459 | A1* | 2/2011 | Smrt | B65D 83/386 222/174 |
| 2013/0248615 | A1 | 9/2013 | Yeates | |
| 2018/0099747 | A1 | 4/2018 | Peng et al. | |

FOREIGN PATENT DOCUMENTS

| | | |
|---|---|---|
| CN | 207078327 U | 3/2018 |
| CN | 108945438 A | 12/2018 |
| CN | 109287598 A | 2/2019 |
| JP | H04-71670 U | 6/1992 |
| JP | H6-261616 A | 9/1994 |
| JP | 2002-45742 A | 2/2002 |
| JP | 2002-059935 A | 2/2002 |
| JP | 2002-119899 A | 4/2002 |
| JP | 2002-193361 A | 7/2002 |
| JP | 2002-308355 A | 10/2002 |
| JP | 2004-358319 A | 12/2004 |
| JP | 2007-75692 A | 3/2007 |
| JP | 2017-104063 A | 6/2017 |
| JP | 2018-531585 A | 11/2018 |
| WO | WO-2017/154937 A1 | 9/2017 |

OTHER PUBLICATIONS

Written Opinion in International Application No. PCT/JP2020/026515 dated Sep. 29, 2020, 4 pages.
Office Action in JP Application No. 2019-205376 dated Feb. 2, 2021, 9 pages.
Office Action in JP Application No. 2019-135203 dated Mar. 2, 2021, 9 pages.
Search Report in International Application No. PCT/JP2020/026515 dated Sep. 29, 2020, 9 pages.
Office Action in TW Application No. 109124624 dated May 31, 2023, 22 pages.

* cited by examiner

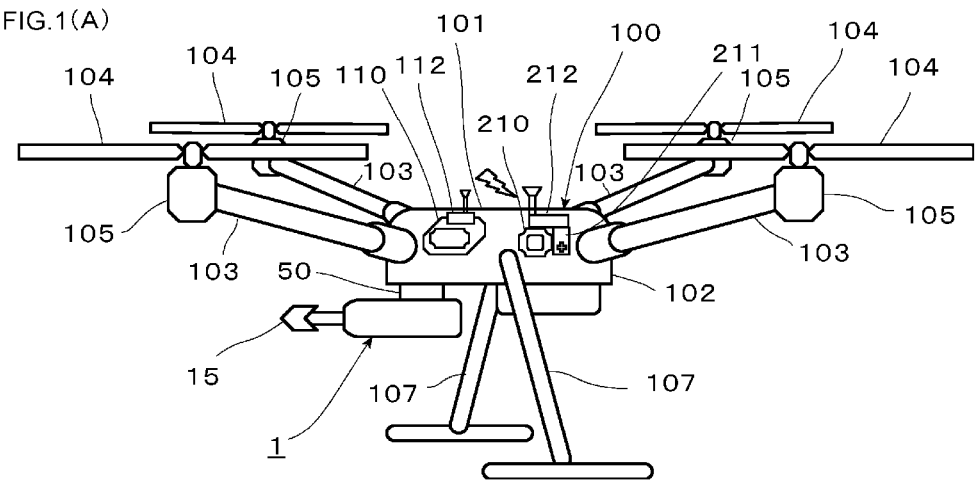
FIG.1(A)
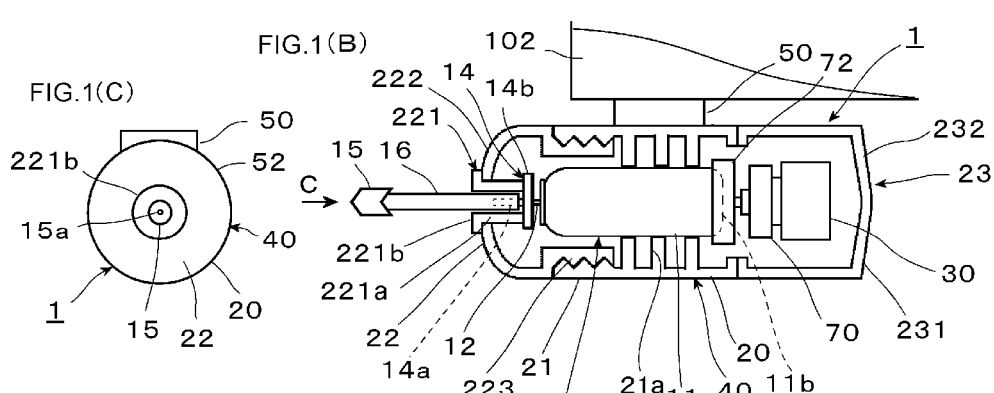
FIG.1(B)
FIG.1(C)
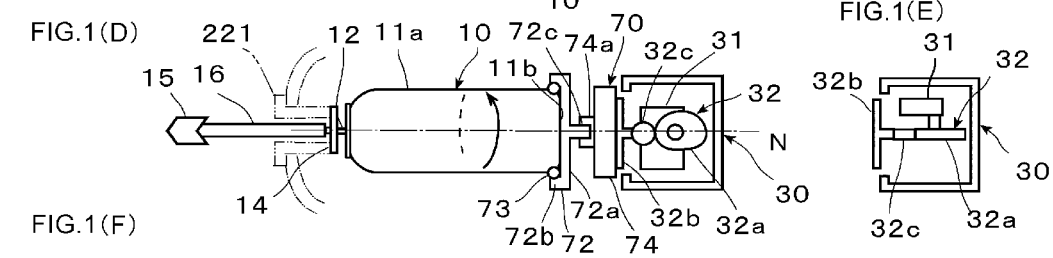
FIG.1(D)
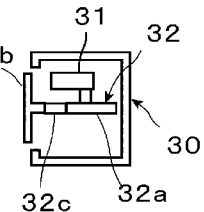
FIG.1(E)
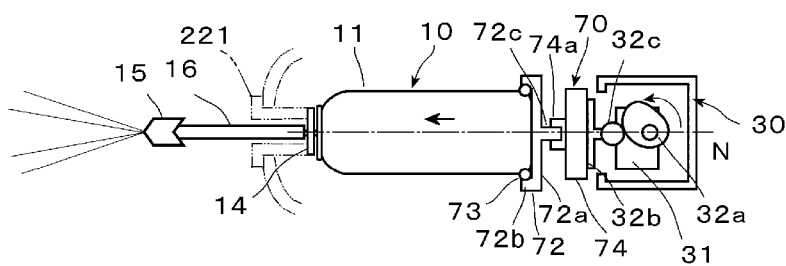
FIG.1(F)

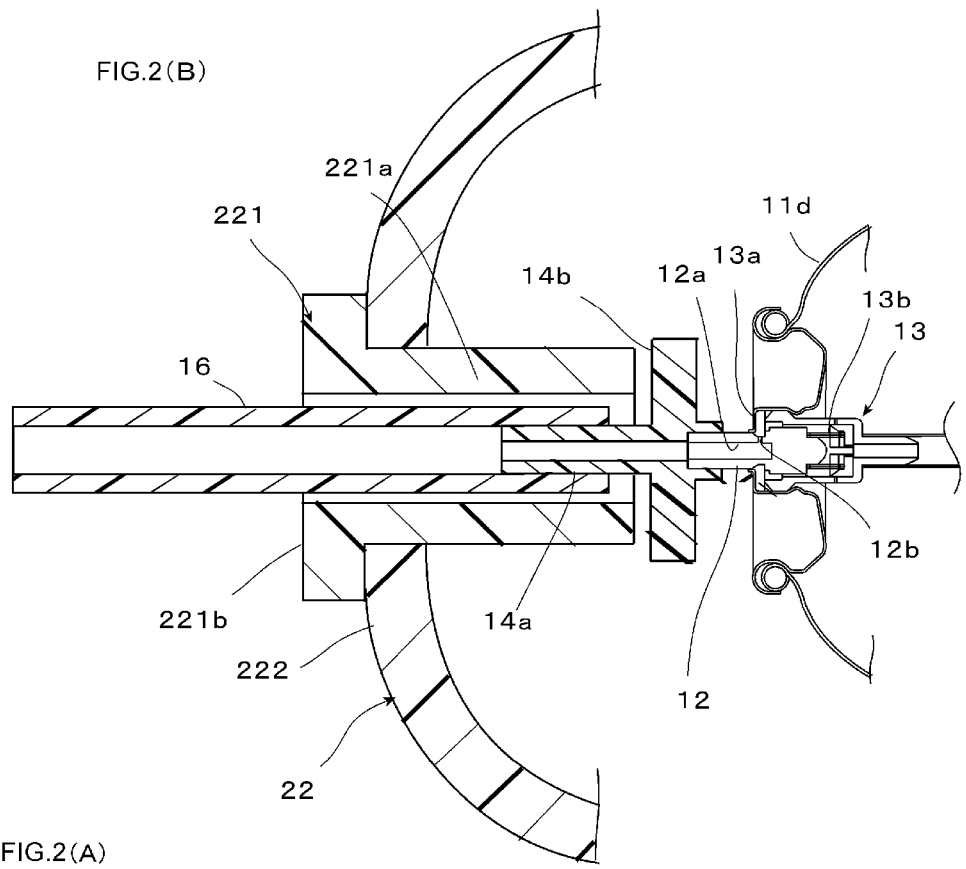
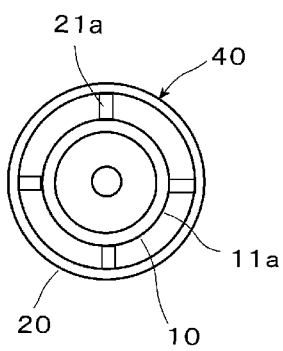
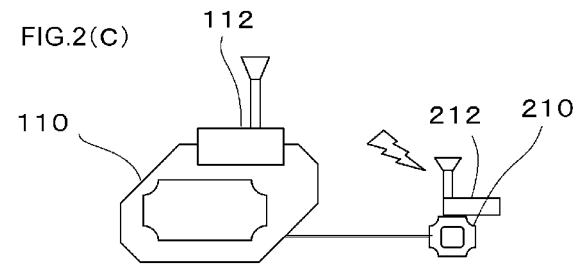

FIG.4(A)
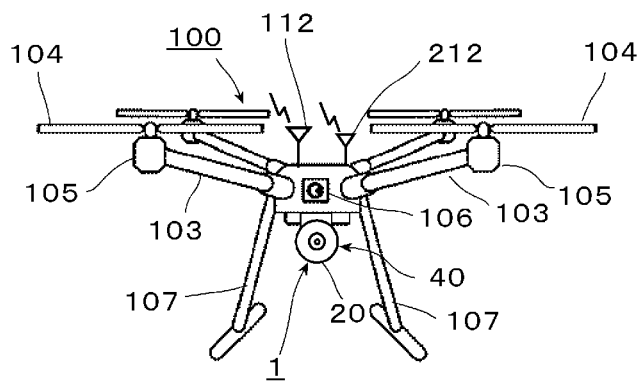
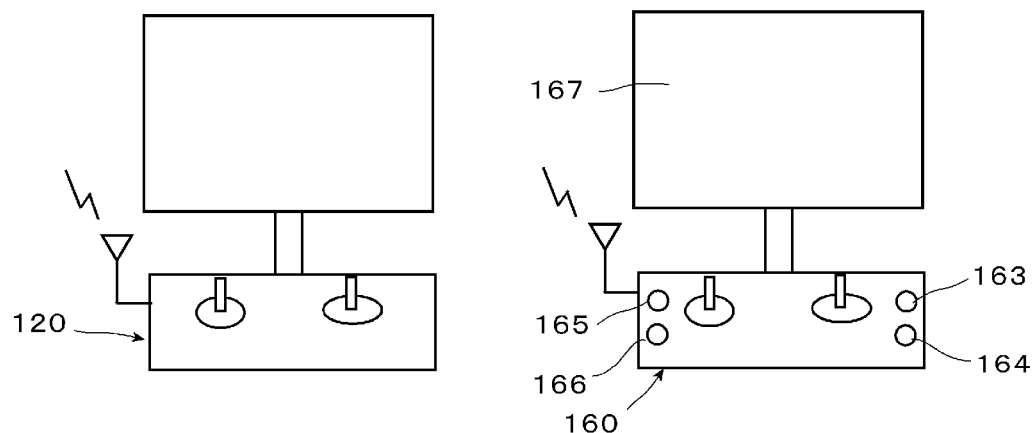
FIG.4(B)
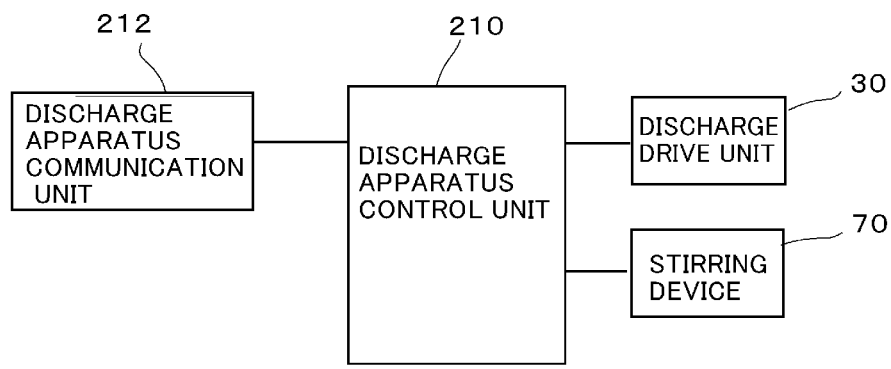

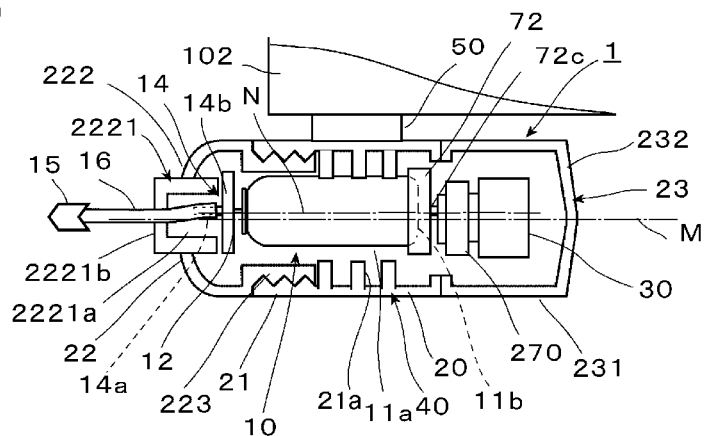
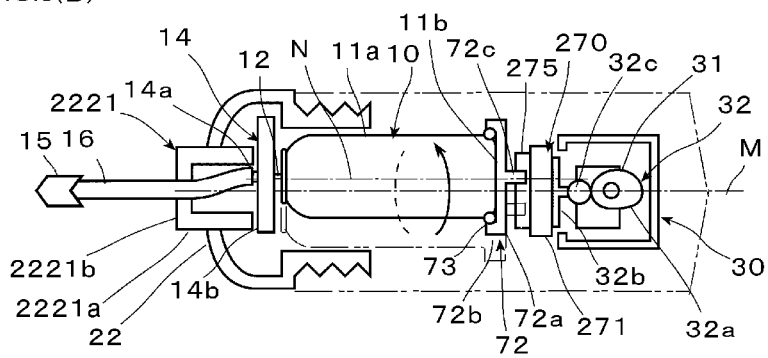
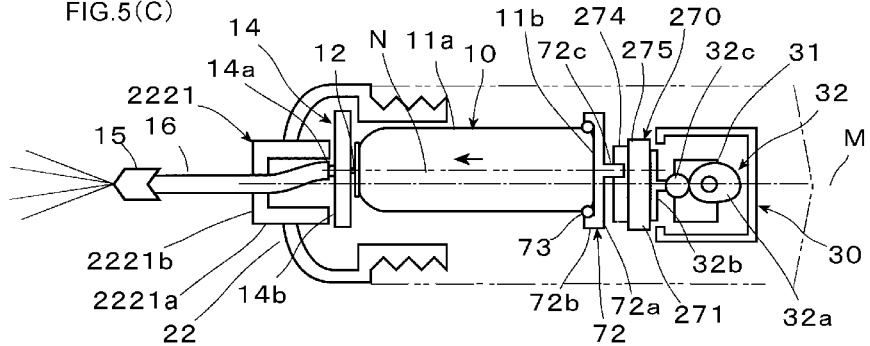

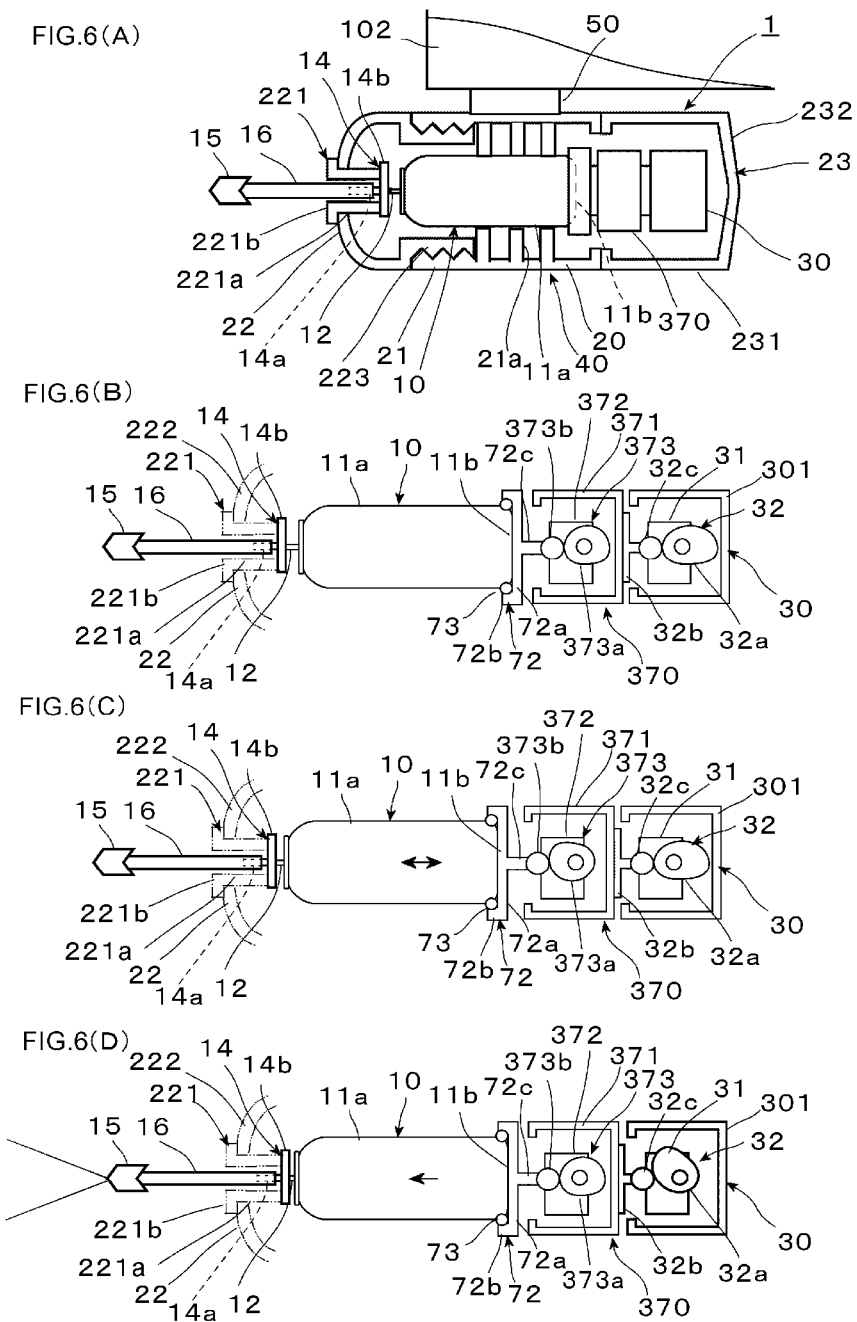

STIRRING DEVICE FOR AEROSOL CONTAINER, DISCHARGE APPARATUS AND DISCHARGE METHOD FOR MOVING VEHICLE, TEMPERATURE ADJUSTING DEVICE, TEMPERATURE HOLDING DEVICE, TEMPERATURE ADJUSTING METHOD AND TEMPERATURE HOLDING METHOD FOR AEROSOL CONTAINER

TECHNICAL FIELD

The present invention relates to a stirring device, a temperature adjusting device, a temperature holding device, a temperature adjusting method, and a temperature holding method for an aerosol container, and more particularly to a technique for appropriately adjusting or holding the concentration, internal pressure, temperature, etc., of a content in an aerosol container which is configured to discharge its content by gas pressure, wherein the aerosol container is mounted on a moving vehicle such as an unmanned aerial vehicle, and is applied to a discharge apparatus for a moving vehicle that discharges liquid, gas, air, sound, etc.

BACKGROUND ART

Conventionally, as a discharge apparatus for an unmanned aerial vehicle (moving vehicle) using this type of aerosol container, there has been known, for example, a device for exterminating bees as described in Patent Literature 1. That is, this bee exterminating device has a chemical supply unit inside an airframe of the aerial vehicle, which supplies a chemical to a honeycomb, and an aerosol container acting as an injection tool is attached to the chemical supply unit.

CITATION LIST

Patent Literature

Patent Literature 1: Japanese Patent Application Laid-Open Publication No. 2017-104063

SUMMARY OF INVENTION

Technical Problem

However, since the device in Patent Literature 1 is only equipped with an aerosol container, there is a problem that, depending on the content, components contained in the content may separate and precipitate, so that the concentration thereof may become non-uniform, resulting in that the concentration of a specific component of the content to be discharged may become low or high, and the quality thereof may become inconsistent.

However, since the device in Patent Literature 1 only has the aerosol container attached thereto, the temperature thereof changes according to a change in the temperature of the external environment. Therefore, the discharge is affected when the atmospheric temperature is out of a usable temperature range of the aerosol container. For example, when the atmospheric temperature is such that the content freezes, the content cannot be discharged.

In addition, in the device of Patent Literature 1, a propellant gas decreases as the aerosol container discharges the content. Moreover, as the content decreases, the compressed gas expands and the internal pressure of the aerosol container decreases. As a result, the initial velocity at the time of discharge may decrease and the scattering or spraying property may decrease, resulting in poor discharge performance.

Further, even in cases where the aerosol container is not mounted on the aerial vehicle, it is necessary to maintain a suitable temperature range or cope with a change in the external temperature.

An object of the present invention is to provide a technique for optimizing properties of a content in an aerosol container, for example, physical quantities such as concentration, temperature, internal pressure and the like.

A specific object of the present invention is to provide a technique that makes it possible to discharge a content of a constant quality by making the concentration of the content uniform.

In addition, another specific object of the present invention is to provide a technique for maintaining good discharge performance of an aerosol container by keeping the temperature of a content in the aerosol container within a suitable range.

Solution to Problem

In order to achieve the above-mentioned objects, a stirring device for an aerosol container according to the present invention is characterized by comprising a stirring means configured to stir a content in the aerosol container.

By providing the stirring means in this way, it is possible to stir the content in the aerosol container thereby to discharge the content of a constant quality, even when the aerosol container is moved to a place where human hands cannot reach, for example.

This stirring device for an aerosol container can also be configured as follows.

1. The stirring device for an aerosol container is mounted on a moving vehicle.

2. The stirring means stirs the content by moving the aerosol container with respect to the moving vehicle.

The content can be stirred only by moving the aerosol container with respect to the moving vehicle. 3. The stirring means stirs the content by rotating the aerosol container around a container center axis of the aerosol container.

By rotating the aerosol container, a swirl flow is generated in the content inside the container, so that the content can be stirred.

4. The stirring means stirs the content by rotating the aerosol container around a rotation center axis eccentric to the container center axis of the aerosol container.

As the aerosol container rotates, it swings in the direction perpendicular to the rotation center axis, thereby making it possible to enhance a stirring effect.

5. The stirring means stirs the content by reciprocating the aerosol container.

The reciprocating movement shakes the content and allows for efficient stirring.

6. The stirring means stirs the content by swinging the aerosol container.

Since the swirl flow repeatedly reverses, efficient stirring can be performed.

7. The stirring means vibrates and stirs the content by vibrating the aerosol container by means of a vibrator.

Due to the vibration, the content is vibrated, so that the content can be stirred. In particular, if an ultrasonic vibrator is used, the content will be accelerated at the molecular level so that the stirring effect will be high.

8. The aerosol container is mounted on the moving vehicle in a state of being housed in a housing member.

Since the aerosol container is attached to an airframe of the aerial vehicle through the housing member, it becomes possible to attach the aerosol container to the airframe without changing the configuration inside the airframe of the aerial vehicle. In other words, it is only necessary to prepare the housing member corresponding to the diameter and size of the aerosol container, so that significant modification of the airframe is not necessary, which is highly convenient. In addition, a mounting method suitable for the shape of the airframe can be adopted, which is highly versatile.

Moreover, for the airframe, the aerosol container can be easily replaced by simply attaching the aerosol container to the airframe together with the housing member or attaching the aerosol container to the housing member mounted on the airframe, thus making replacement work easier.

Further, the aerosol container is protected from impact by the housing member, which provides a high level of safety. In particular, by increasing the degree of sealing of the housing member, the degree to which a container main body is directly exposed to the external environment decreases, and fluctuations in the internal pressure due to temperature changes can be suppressed.

9. The stirring means stirs the content by moving the aerosol container in the housing member.

10. The content is stirred by moving the housing member together with the aerosol container with respect to the moving vehicle.

11. The aerosol container is mounted on the moving vehicle in a state of being exposed to an external space, and the stirring means moves the aerosol container to stir the content.

12. A drive means is provided for driving a discharge drive unit of the aerosol container.

An existing aerosol container can be used as it is, so that the content therein can be discharged.

13. The stirring means includes a control means capable of driving a discharge opening and closing part during stirring.

In this way, control is simple, and stirring can be performed with an inexpensive motor.

14. The moving vehicle is provided with a means configured to offset a reaction force generated due to stirring by the stirring means.

In this way, the moving vehicle can be moved stably even when the aerosol container is in motion.

15. A heating means configured to heat the aerosol container is provided.

16. The moving vehicle is an aerial vehicle.

Even in cases where the moving vehicle is an aerial vehicle, the content of a constant quality can be discharged by stirring the content in the aerosol container in the sky.

Also, a discharge apparatus for a moving vehicle according to another invention,
which includes an aerosol container mounted on the moving vehicle and discharges a content in the aerosol container,
is characterized by comprising a stirring device for the aerosol container.

In addition, a discharge method for a moving vehicle according to still another invention, in which an aerosol container mounted on the moving vehicle is provided and a content in the aerosol container is discharged, is characterized by comprising:
a stirring step of stirring the content in the aerosol container;
wherein the content in the aerosol container is discharged after the stirring step.

According to the discharge method of the present invention, the content is discharged after being stirred, so that the content having a constant quality can be discharged at all times.

Moreover, a further invention is directed to a discharge method, in which an aerosol container mounted on a moving vehicle is provided and a content in the aerosol container is discharged, and which is characterized by comprising:
a stirring step of stirring a content in the aerosol container;
wherein the content in the aerosol container is discharged during the stirring step.

In this way, even if the content is discharged during the stirring step, the content of a constant quality can be discharged.

The discharge method for an aerial vehicle can be configured as follows.

1. The discharge of the content is continuously performed a plurality of times at intervals.

By stirring the content before or at the same time as the discharge, the content of a quality as constant as possible can be discharged, even when the content is discharged for a long period of time.

2. In the stirring step, stirring is performed while offsetting a reaction force generated on the moving vehicle by stirring.

The container can be stabilized to discharge the content.

Further, in order to achieve the above-mentioned objects, a temperature adjusting device of the present invention is a temperature adjusting device for an aerosol container which is provided with a temperature adjusting means configured to adjust a temperature of the aerosol container.

By using such a temperature adjusting device, it is possible to maintain a temperature suitable for discharging a content in the aerosol container, so that good discharge performance can be maintained.

This temperature adjusting device can be configured as follows.

1. The temperature adjusting device for an aerosol container is mounted on an aerial vehicle.

The aerosol container mounted on the aerial vehicle is susceptible to changes in external atmospheric temperature and cannot be touched directly after the flight has started, but such a situation can be easily coped with by providing the aerial vehicle with the temperature adjusting device.

2. The aerosol container is filled with a compressed gas as a propellant.

3. The temperature adjusting means includes a heating means.

4. The heating means heats a body portion of the aerosol container.

When the temperature adjusting means performs heating, safety against heating can be enhanced by using the compressed gas as the propellant of the aerosol container. Due to the increased safety against heating in this way, it becomes possible to heat the body portion of the container, so that the temperature thereof can be efficiently adjusted.

5. The temperature adjusting means includes a cooling means.

The temperature adjusting means performs cooling, so that even when the temperature of the aerosol container becomes high due to a rise in atmospheric temperature or the like, the temperature thereof can be maintained at a level suitable for discharge.

6. The temperature adjusting device is provided in a housing member in which the aerosol container is housed.

By providing the housing member of the aerosol container with the temperature adjusting device, they can be replaced as a unit.

7. Provision is made for a control means configured to calculate an internal pressure of the aerosol container from the temperature of the aerosol container.

By calculating the internal pressure of the aerosol container, the state thereof can be grasped and utilized for temperature adjustment and the like.

8. The control means corrects the calculated internal pressure of the aerosol container based on the amount of the aerosol container used.

This allows for a more accurate calculation of the internal pressure of the aerosol container.

9. Provision is made for a temperature obtaining means configured to obtain the temperature of the aerosol container and an atmospheric pressure obtaining means configured to obtain an atmospheric pressure outside the aerosol container, wherein the control means calculates the internal pressure by using the temperature and the atmospheric pressure.

Thus, an accurate internal pressure can be calculated based on the temperature and the atmospheric pressure.

10. The temperature adjusting device is capable of accepting an input of information for calculating the internal pressure.

Thus, the internal pressure can be calculated based on the input information from an operator or the like.

11. The control means controls the pressure of a discharge material from the aerosol container by controlling the temperature adjusting means based on the calculated internal pressure.

This makes it possible to maintain desired discharge performance.

12. Provision is made for a temperature holding means configured to hold the temperature of the aerosol container.

This allows the temperature to be maintained as much as possible, thus making it possible to reduce the power consumption used for temperature adjustment.

Moreover, in order to achieve the above-mentioned objects, a temperature holding device of the present invention includes a temperature holding means configured to hold the temperature of the aerosol container.

By using such a temperature holding device, it is possible to maintain a temperature suitable for discharging the content in the aerosol container, so that good discharge performance can be maintained.

This temperature holding device can be configured as follows.

1. The temperature holding device for an aerosol container is mounted on the aerial vehicle.

The aerosol container mounted on the aerial vehicle is susceptible to changes in external atmospheric temperature and cannot be touched directly after the flight has started, but such a situation can be easily coped with by providing the aerial vehicle with the temperature holding device.

2. The aerosol container is mounted on the aerial vehicle in a state of being housed in a housing member, and the housing member also serves as the temperature holding means.

By providing the housing member, the aerosol container can be replaced integrally with the temperature holding device. In addition, since the housing member itself exhibits a temperature holding function, it is not necessary to separately provide a temperature holding means.

3. The aerosol container is mounted on the aerial vehicle in a state of being housed in the housing member, and the temperature holding means is provided in the housing member.

By providing the housing member, the aerosol container can be replaced integrally with the temperature holding device. Moreover, the temperature holding means such as a heat insulating material or the like can be replaced separately from the housing member.

Further, in order to achieve the above-mentioned object, a temperature adjusting method of the present invention is a temperature adjusting method for an aerosol container that includes a temperature adjusting step of adjusting the temperature of the aerosol container.

According to such a temperature adjusting method, it is possible to maintain a temperature suitable for discharging the content in the aerosol container, so that good discharge performance can be maintained.

This temperature adjusting method can be configured as follows.

1. The aerosol container is mounted on an aerial vehicle.

The aerosol container mounted on the aerial vehicle is susceptible to changes in external atmospheric temperature and cannot be touched directly after the flight has started, but such a situation can be easily coped with by performing a temperature adjusting step.

2. The aerosol container is filled with a compressed gas as a propellant.

3. The temperature adjusting step includes a heating step.

4. In the heating step, the body of the aerosol container is heated.

When the temperature adjusting step includes the heating step, safety against heating can be enhanced by using the compressed gas as the propellant of the aerosol container. Due to the increased safety against heating in this way, it becomes possible to heat a body portion of the container, so that the temperature thereof can be efficiently adjusted.

5. The temperature adjusting step includes a cooling step.

By performing cooling, the aerosol container can maintain a suitable temperature for discharging even when the temperature of the aerosol container becomes high due to an increase in atmospheric temperature or the like.

6. The aerosol container is housed in a housing member.

The aerosol container can be replaced integrally with the housing member.

7. Provision is made for a control step of calculating an internal pressure of the aerosol container from the temperature of the aerosol container.

By calculating the internal pressure of the aerosol container, the state thereof can be grasped and utilized for temperature adjustment and the like.

8. In the control step, the calculated internal pressure of the aerosol container is corrected based on the amount of the aerosol container used.

This allows for a more accurate calculation of the internal pressure of the aerosol container.

9. Provision is made for a temperature obtaining step of obtaining the temperature of the aerosol container, and an atmospheric pressure obtaining step of obtaining an atmospheric pressure outside the aerosol container, wherein in the control step, the internal pressure is calculated by using the temperature and the atmospheric pressure.

Thus, an accurate internal pressure can be calculated based on the temperature and the atmospheric pressure.

10. Provision is made for a step of accepting an input of information for calculating the internal pressure.

Thus, the internal pressure can be calculated based on the input information from an operator or the like.

11. The pressure of a discharge material from the aerosol container is controlled by controlling the temperature adjusting step based on the internal pressure calculated in the control step.

This makes it possible to maintain desired discharge performance.

12. The temperature of the aerosol container is held by a temperature holding means.

By providing the temperature holding means, the temperature of the aerosol container can be maintained as much as possible, so that the power consumption used for temperature adjustment can be reduced.

Further, in order to achieve the above-mentioned objects, a temperature holding method of the present invention is a method for holding a temperature of an aerosol container by a temperature holding means.

By using such a temperature holding method, it is possible to maintain a temperature suitable for discharging a content in the aerosol container, so that good discharge performance can be kept.

Advantageous Effects of Invention

As described above, according to the present invention, properties of a content in an aerosol container, for example, physical quantities such as concentration, temperature, internal pressure, etc., can be optimized.

In particular, by stirring the content in the aerosol container, it is possible to always discharge the content of a homogenized and constant quality.

In addition, by setting the temperature of the content in the aerosol container within a suitable range, it is possible to provide a technique for maintaining good discharge performance of the aerosol container.

BRIEF DESCRIPTION OF DRAWINGS

FIG. 1 conceptually illustrates a discharge apparatus for an aerial vehicle according to a first embodiment of a first invention, wherein (A) is a perspective view illustrating an entire configuration of the aerial vehicle; FIG. 1(B) is a cross-sectional view of the discharge apparatus; FIG. 1(C) is a view in the direction of an arrow C in FIG. 1(B); FIG. 1(D) is an explanatory view of a stirring step; FIG. 1(E) is a plan view of a discharge drive unit in FIG. 1(D); and FIG. 1(F) is an explanatory view of a discharge step.

FIG. 2(A) is a cross-sectional view in a direction perpendicular to an axis of a sleeve of FIG. 1; FIG. 2(B) is a view illustrating an example of a valve mechanism of the aerosol container of FIG. 1; and FIG. 2(C) is a view illustrating an example in which a power source of a flight control unit is used as a power source.

FIG. 3(A) through FIG. 3(C) are views illustrating three types of the discharge drive unit.

FIG. 4(A) is an explanatory view illustrating an example of remote operation of a control terminal and a discharge operation terminal for the aerial vehicle with the discharge apparatus mounted thereon; and FIG. 4(B) is a control block diagram thereof.

FIG. 5(A) is a cross-sectional view of a discharge apparatus for an aerial vehicle according to a second embodiment of the first invention; FIG. 5(B) is an explanatory view of a stirring step; and FIG. 5(C) is an explanatory view of a discharge step.

FIG. 6(A) is a cross-sectional view of a discharge apparatus for an aerial vehicle according to a third embodiment of the first invention; FIG. 6(B) is a view illustrating main components of the discharge apparatus; FIG. 6(C) is an explanatory view of a stirring step; and (D) is an explanatory view of a discharge step.

FIG. 7(A) is a cross-sectional view of a discharge apparatus for an aerial vehicle according to the third embodiment of the first invention; FIG. 7(B) is a view illustrating main components thereof; FIG. 7(C) is an explanatory view of a stirring step; and FIG. 7(D) is an explanatory view of a discharge step of FIG. 7(B).

FIG. 8(A) is a cross-sectional view of a discharge apparatus for an aerial vehicle according to a fourth embodiment of the first invention; FIG. 8(B) is an explanatory view of a stirring step; and FIG. 8(C) is a view of an aerosol container of FIG. 8(B) as viewed from a rotation center axis direction.

FIG. 9(A) is a cross-sectional view of a discharge apparatus for an aerial vehicle according to a fifth embodiment of the first invention; FIG. 9(B) is an explanatory view of a stirring step; and FIG. 9(C) is an explanatory view of a discharge step.

FIG. 10 is a schematic cross-sectional view of a discharge apparatus for an aerial vehicle according to a sixth embodiment of the first invention.

FIG. 11(A) is a cross-sectional view of a discharge apparatus for an aerial vehicle according to a seventh embodiment of the first invention; and FIG. 11(B) is an explanatory view of a stirring step.

FIG. 12 is a cross-sectional view of a discharge apparatus for an aerial vehicle according to a first embodiment of a second invention.

FIG. 13(A) is an explanatory view illustrating an example of remote operation of a control terminal and a discharge operation terminal for the aerial vehicle with the discharge apparatus mounted thereon; and FIG. 13(B) is a control block diagram thereof.

FIG. 14 conceptually illustrates a temperature adjusting device for an aerosol container according to a second embodiment of the second invention, wherein FIG. 14(A) is a cross-sectional view of a discharge apparatus; and FIG. 14(B) is a view seen from the direction of an arrow C in (A).

FIG. 15 conceptually illustrates a temperature adjusting device for an aerosol container according to a third embodiment of the second invention, and is a cross-sectional view of a discharge apparatus.

FIG. 16 is a cross-sectional view conceptually illustrating a temperature adjusting device for an aerosol container according to a fourth embodiment of the second invention, wherein FIG. 16(A) illustrates a state in which the temperature adjusting device is used for heating; and FIG. 16(B) illustrates a state in which the temperature adjusting device is used for cooling.

FIG. 17 conceptually illustrates a temperature holding device for an aerosol container according to a first embodiment of a third invention, and is a cross-sectional view of a discharge apparatus that holds its temperature by thermal insulation.

FIG. 18 conceptually illustrates a temperature holding device for an aerosol container according to a second embodiment of the third invention, and is a cross-sectional view of a discharge apparatus that holds its temperature by ventilation.

FIG. 19 is a cross-sectional view illustrating an example of a discharge apparatus for an aerial vehicle in which a stirring device and a temperature adjusting device are combined with each other.

DESCRIPTION OF EMBODIMENTS

Hereinafter, the present invention will be described in detail on the basis of embodiments illustrated in the drawings.

The dimensions, materials, shapes, relative arrangements, etc., of the components described in the following embodiments should be changed as appropriate depending on the configuration and various conditions of an apparatus to which the invention is applied, and are not intended to limit the scope of the invention to the following embodiments.

The present invention optimizes the physical quantities of a content in the aerosol container, i.e., the concentration, temperature, internal pressure, etc. of the content. As a specific means, a first invention has a stirring means for the content; a second invention has a temperature adjusting means configured to adjust the temperature of the content; and a third invention has a temperature holding means configured to hold the temperature of the content. In the first invention, the concentration of the content can be made uniform by stirring the content. In the second invention, by adjusting the temperature of the content, the content can be maintained in an appropriate temperature range, and the internal pressure of the content can be kept within an appropriate range. In the third invention, a decrease and an increase in the temperature of the content can be minimized, though the temperature is not actively adjusted. These inventions can be combined as appropriate.

In the following embodiments, cases where these inventions are applied to a discharge apparatus for an aerial vehicle will be described as examples. The discharge apparatus for an aerial vehicle has an aerosol container mounted on an aerial vehicle, and discharges a content in the aerosol container from the sky. The environment around the aerosol container mounted on the aerial vehicle, such as ambient temperature, atmospheric pressure and the like, constantly changes depending on the time zone of the day, the season, and the altitude of flight, and hence, the application of the present invention is particularly effective from the viewpoint of maintaining discharge performance.

First Embodiment of First Invention

First, an overall configuration of a discharge apparatus for an aerial vehicle will be described with reference to FIGS. 1(A) through 1(C). FIG. 1 conceptually illustrates the discharge apparatus for an aerial vehicle according to a first embodiment of the present invention, wherein FIG. 1(A) is a perspective view of the entire aerial vehicle with the discharge apparatus mounted thereon, and FIG. 1(B) a cross-sectional view of the discharge apparatus mounted on the aerial vehicle, and FIG. 1(C) is a view of FIG. 1(B) seen from the direction C.

In FIG. 1(A), 100 denotes the aerial vehicle. The aerial vehicle 100 is an unmanned aircraft such as a so-called multicopter or the like, and an airframe 101 thereof includes an airframe fuselage 102, four arm portions 103 radially extending from the airframe fuselage 102, and leg portions 107 for taking off and landing, wherein four rotor blades 104 are provided at distal ends of the arm portions 103 through motors 105, respectively. In the illustrated example, a quadcopter having four rotor blades 104 is illustrated, but various known multicopters such as those having three rotor blades (tricopter), six rotor blades (hexacopter) or the like are applicable. A yaw axis, a roll axis, and a pitch axis of the airframe 101 are a vertical direction, a left-right direction, and a front-back direction of the drawing sheet, respectively. An upper side of the drawing sheet is an upper side of the airframe 101, and a left side of the drawing sheet is a front side of the airframe 101.

The discharge apparatus 1, in which an aerosol container is housed, is mounted on the outside of the airframe 101 of the aerial vehicle 100, i.e., on a lower surface of an airframe fuselage 102 in the illustrated example, through a discharge apparatus support portion 50. The discharge apparatus 1 is an elongated body, and is arranged with its longitudinal direction facing a roll axis direction, with a nozzle 15 protruding from its front end portion toward the front of the airframe.

As illustrated in FIG. 1(B), the discharge apparatus 1 has the aerosol container 10, and discharges a content in the aerosol container 10 in a state of being mounted on the airframe 101. The content to be discharged includes not only liquid but also gas such as gaseous matter, air or the like, powder or the like, and further includes sound (horn) and the like. The discharge of sound is configured, for example, such that sound is generated when gas is discharged.

The aerosol container 10 is mounted on the airframe 101 in a state of being housed in a sleeve (housing member) 20. The sleeve 20 incorporates therein a discharge drive unit 30 for discharging the content from the aerosol container 10, and a stirring device 70 for stirring the content by rotating the aerosol container 10. The sleeve 20 and the aerosol container 10 are replaceable as a unit, and in the following description, an assembly in which the aerosol container 10 is housed in the sleeve 20 is referred to as an aerosol container assembly 40. Hereinafter, the configuration of each part or unit will be described.

[Aerosol Container]

The aerosol container 10 is a container that discharges its content by gas pressure of liquefied gas or compressed gas filled therein, and an existing aerosol container made of metal can be applied, or a container made of plastic having pressure resistance can be used. In the aerosol container 10, various actuators in which a flow passage is formed according to a discharge direction or a discharge form can be attached to a stem 12. In the illustration, an example is shown in which an actuator 14 having a flange portion **14*b* is attached to the stem 12 of the aerosol container 10. The actuator 14 is configured to include a linear main body portion 14*a* having a straight discharge flow passage, and the flange portion 14*b* protruding from the main body portion 14*a* in a direction perpendicular to the axis thereof. The nozzle 15 having an injection hole 15*a* (see FIG. 1(C)) is connected to the main body portion 14*a* of the actuator 14 through a connecting tube 16. The injection hole 15*a*** is appropriately selected depending on whether the content is to be discharged in a mist form or as a linear jet flow, or depending on the discharge form and the discharge direction of the content.

In the illustrated example, the aerosol container 10 is used by being horizontally mounted on the lower surface of the airframe 101, and hence, as the form of a propellant and a content to be sealed, an isolation type is used in which a stock solution is contained in an inner bag and the propellant is contained between an outer periphery of the inner bag and an inner periphery of the container main body. In the case of the isolated type, discharge can be made from the aerosol container even when the aerosol container is in a horizontal direction (the stem is positioned horizontally) or in a downward direction (the stem is positioned downward).

However, the form of the propellant and the content to be sealed is not limited to the isolated type, but a two-phase type or three-phase type container with a dip tube can be applied in cases where the posture of the aerosol container 10 at the time of discharge is used with the stem 12 facing upward, and a two-phase type or three-phase type container having no dip tube can be applied in cases where the posture of the aerosol container 11 is used with the stem 12 facing downward.

Here, note that liquefied gases such as general hydrocarbons (liquefied petroleum gas) (LPG), dimethyl ether (DME), fluorinated hydrocarbons (HFO-1234ZE), etc., as well as compressed gases such as carbon dioxide ($CO_2$), nitrogen ($N_2$), nitrous oxide ($N_2O$), etc., can be used as propellants, but non-flammable fluorinated hydrocarbons, carbon dioxide, nitrogen, nitrous oxide, etc., are preferable in consideration of safety against fire, and nitrogen is particularly preferable in consideration of environmental load.

[Configuration of Sleeve 20]

The sleeve 20 is made of a strong, lightweight material such as aluminum or other metals, plastic, carbon fiber, etc. In addition, not only a hard material but also a soft material, for example, a rubber material such as silicone rubber, urethane foam or the like can be used. In short, various materials capable of retaining the shape of the housing portion that houses the aerosol container 10 can be used. The term "sleeve" is used to mean a tubular member in which the cylindrical aerosol container 10 is housed.

The sleeve 20 is composed of a cylindrical sleeve main body 21 with a larger diameter than the aerosol container 10, a first end cover portion 22 covering one end of the sleeve main body 21, and a second end cover portion 23 provided at the other end of the sleeve main body 21.

The first end cover portion 22 is configured to be detachably screwed and fixed to the sleeve main body 21 through a threaded portion, and the second end cover portion 23 is undetachably fixed to the sleeve main body 21. The second end cover portion 23 and the sleeve main body 21 may be integral with each other.

The first end cover portion 22 is configured to include a dome-shaped cover main body 222, and a threaded tubular portion 223 that is screwed into a female threaded portion of the sleeve main body 21. The cover main body 222 has a conical shape with a rounded tip or a dome-shaped curved surface whose diameter is gradually reduced toward its tip in consideration of aerodynamic characteristics. With such a shape having good aerodynamic characteristics, the influence of horizontal wind (crosswind) is reduced, and flight can be stabilized.

The second end cover portion 23, which is located at the bottom side of the aerosol container 10, houses the stirring device 70 for rotationally driving the aerosol container 10 and the discharge drive unit 30. This second end cover portion 23 is configured to include a tubular portion 231 having one end fixed to a rear end portion of the sleeve main body 21 (a bottom side end portion of the aerosol container 10), and an end plate 232 closing the other end of the tubular portion 231.

[Support Structure of Aerosol Container 10]

The inner diameter of the sleeve 20 is larger than the outer diameter of a body portion 11a of the aerosol container 10, and an inner wall of the sleeve 20 is provided with one or more radial support portions 21a that support the aerosol container 10 at a certain distance away from the wall surface of the sleeve 20. The radial support portions 21a are provided at a plurality of locations in the axial direction, i.e., at three locations in the illustrated example, and support the aerosol container 10 so as to allow movement in the axial direction and prevent movement in the orthogonal direction with respect to the sleeve 20. The individual radial support portions 21a may have a support structure in which they partially contacts the body portion 11a of the aerosol container 10 at a plurality of locations in the circumferential direction, as illustrated in FIG. 2(A), or may have a configuration in which the entire circumference thereof is supported by an annular wall. As a method of supporting the aerosol container 10 in the radial direction, in addition to the structure of supporting the body portion 11a of the aerosol container 10, both ends such as a shoulder and a bottom of the aerosol container 10 can be supported, with the body portion 11a being supported in a state separated from the inner wall of the sleeve 20.

In addition, the body portion 11a of the aerosol container 10 can be supported without separating it from the inner wall of the sleeve 20, but by separating the body portion 11a of the aerosol container 10 from the inner wall of the sleeve 20, a heat insulation material and/or a heat storage material can be interposed in a separation space.

It should be noted that the sleeve 20 may not have a sealed structure, but may have a structure in which a part thereof is vented. For example, a structure such as a mesh or network structure, a punched structure or the like can be applied. In this way, there can be obtained advantageous effects such as mitigating the self-cooling at the time of aerosol discharge with outside air, and reducing the weight of the sleeve 20.

On the other hand, a bottom portion 11b of the aerosol container 10 is supported by the stirring device 70 arranged at the side of the second end cover portion 23, and a head portion side of the aerosol container 10 is supported by a pressing member 221 provided on the first end cover portion 22.

The pressing member 221 includes a tubular body 221a protruding from the top of the first end cover portion 22 toward the stem 12 in the central axis direction of the aerosol container 10, and an end flange portion 221b provided at one end of the tubular body 221a and fixed to the first end cover portion 22. The connecting tube 16 connecting the actuator 14 and the nozzle 15 to each other is inserted into an inner periphery of the tubular body 221a of the pressing member 221 so as to be slidable in the axial direction, and a distal end surface of the tubular body 221a is in abutment with or close to the flange portion 14b of the actuator 14. This pressing member 221 may be formed integrally with the second end cover portion 23.

Next, the discharge drive unit 30 and the stirring device 70 will be described with reference to FIGS. 1(D) through 1(F).

The discharge drive unit 30 and the stirring device 70 are arranged in series in the second end cover portion 23 in the order of the stirring device 70 and the discharge drive unit 30 from the bottom portion 11b of the aerosol container 10 toward the rear along a container center axis N of the aerosol container 10. The discharge driving unit 30 is fixed to the second end cover portion 23, and the stirring device 70 is movable in the axial direction together with the aerosol container. The stirring device 70 is connected to the bottom portion 11b of the aerosol container 10 to rotationally drive the aerosol container 10, and the discharge drive unit 30 moves the aerosol container 10 in the axial direction through the stirring device 70 to control the discharge and stop of the content.

First, the discharge drive unit 30 will be described.

The discharge drive unit 30 moves the aerosol container 10 to its head side in the axial direction by pushing the aerosol container 10 in the axial direction from the bottom portion 11b side through the stirring device 70. By the movement of the aerosol container 10, the actuator 14 is pressed against the tubular body 221a of the pressing member 221, and by the reaction force thereof, the stem 12 is pushed into the aerosol container 10 so that the valve mechanism in the aerosol container 10 is opened. When the valve mechanism is opened, the content is automatically discharged by the gas pressure.

The discharge drive unit 30 includes a motor 31 serving as a rotary drive source, and a cam mechanism 32 configured to convert the rotational motion of the motor 31 into linear motion of a movable plate 32b coupled to the stirring device 70. The motor 31 and the cam mechanism 32 are fixed to the second end cover portion 23. The cam mechanism 32 has a cam 32a that is rotationally driven by the motor 31, and the driven-side movable plate 32b that moves linearly in the direction of the container center axis N of the aerosol container 10. The movable plate 32b is provided with a cam follower 32c that moves along a cam surface of the cam 32a. The cam 32a in the illustrated example is an oval disc cam, and a camshaft of the cam 32a is orthogonal to the central axis of the aerosol container 10, so that the rotation of the cam 32a is converted into linear motion of the movable plate 32b via the cam follower 32c. Since the cam 32a is the disc cam, an urging means such as a spring is provided as appropriate to keep the cam follower 32c in contact with the cam 32a at all times.

The cam 32a is normally in contact at its smallest diameter portion with the cam follower 32c, and the movable plate 32b is in a retracted limit position, so that the valve mechanism of the aerosol container 10 is held in a closed state. By rotating the cam 32a by means of the motor 31, the movable plate 32b is caused to move forward in the axial direction (FIG. 1(D)). That is, a contact position of the cam 32a, with which the cam follower 32c comes into contact at the retracted limit position, is set to have a smaller radius from the center of rotation, and a contact position of the cam 32a, with which the cam follower 32c comes into contact at the forward limit position, is set to have a larger radius from the center of rotation. In the illustrated example, the valve mechanism is opened not at the largest diameter portion of the cam 32a but at a transition portion from the smallest diameter portion to the largest diameter portion, but it may be configured to open at the largest diameter portion.

[Configuration of Valve]

FIG. 2(B) illustrates an example of the valve mechanism 13 of the aerosol container 10 that is opened by the discharge drive unit 30.

That is, the stem 12 is formed with a discharge flow passage 12a extending by a predetermined length in the axial direction thereof from its tip opening portion, and a stem hole 12b, which serves as a valve hole, is opened through the side surface of the stem 12, wherein the stem hole 12b is sealed by the inner peripheral surface of a gasket 13a mounted on the hole edge of an insertion hole in a mounting cup 11d.

Normally, the stem 12 is urged in a protruding direction by the gas pressure and the urging force of a spring 13b, and the inner peripheral edge of the gasket 13a, which serves as a valve body, is pressed in the axial direction, so that the inner peripheral surface of the gasket 13a comes into close contact with the hole edge of the stem hole 12b, which constitutes a valve seat, thereby maintaining a valve closed state.

When the movable plate 32b is moved to a forward limit by the cam mechanism 32 of the discharge drive unit 30, the aerosol container 10 is caused to move toward the first end cover portion 22, so that the flange portion 14b of the flanged actuator 14 comes into contact with the end surface of the pressing member 221, and the stem 12 is relatively pushed toward the inside of the container by a reaction force thereof. When the stem 12 is pushed in, the inner peripheral edge of the gasket 13a is bent or flexed toward the inside of the container, so that the inner peripheral surface of the gasket 13a is moved away from the hole edge of the stem hole 12b to open the valve mechanism, whereby the content pushed by the gas pressure is discharged from the discharge flow passage 12a in the stem 12.

The valve mechanism 13 in the illustrated example is an example, and is not limited to such a configuration, but various configurations can be applied in which the valve mechanism is normally maintained in a closed state, and is opened by pushing in the stem 12.

In this example, the rotational motion of the motor 31 is converted into linear motion by the cam mechanism 32, but the present invention is not limited to the cam mechanism 32, and any mechanism, which converts the rotational motion of the motor 31 into linear motion, such as a screw feed mechanism, a rack and pinion or the like can be applied. In addition, instead of the rotary motor, a linear drive source such as a linear motor for linear drive, an electromagnetic solenoid or the like may be used to move the aerosol container 10 in the axial direction without using a motion conversion mechanism.

[Stirring Device 70]

Next, returning to FIG. 1(D), the stirring device 70 will be described.

The stirring device 70 is arranged in series between the discharge drive unit 30 and the aerosol container 10. In this embodiment, the aerosol container 10 is configured to rotate about its central axis, and includes a container holding portion 72 that holds the bottom portion of the aerosol container 10 with a predetermined holding force, and a motor 74 that rotationally drives the container holding portion 72.

The container holding portion 72 includes a circular plate portion 72a that is in contact with the bottom portion 11b of the aerosol container 10, an annular convex portion 72b that holds the bottom side end portion of the body portion 11a of the aerosol container 10 from an outer diameter end portion of the circular plate portion 72a, and a connecting shaft portion 72c that is formed at a center portion of a motor-side surface of the circular plate portion 72a. An anti-slip material 73 for increasing a friction force with the container body portion is mounted on the annular convex portion 72b. The motor 74 is arranged so that an output shaft 74a thereof coincides with the container center axis N of the aerosol container 10 and is connected to the connecting shaft portion 72c provided in the container holding portion 72. The motor 74 is connected at its end surface on the discharge drive unit 30 side to the movable plate 32b of the discharge drive unit 30.

[Three Types of Discharge Drive Unit]

The discharge drive unit 30 illustrated in FIG. 1 is an example, and any of three types or systems illustrated in FIG. 3 can be applied as the configuration of the discharge drive unit 30. In FIG. 3, the sleeve 20 is indicated by a square for simplification.

FIG. 3(A) shows a configuration in which the actuator 14 of the aerosol container 10 is fixed to the sleeve 20, so that a contact member 30B in contact with the bottom portion 11b of the aerosol container 10 is pushed up by a drive unit 30A. The discharge drive unit 30 in FIG. 1 is an example of this type. In this type, the actuator 14 side attached to the stem 12 is fixed, so that the discharge position accuracy is high. In addition, it can be used for aerosol containers 10 having various diameters.

Figure 3B:
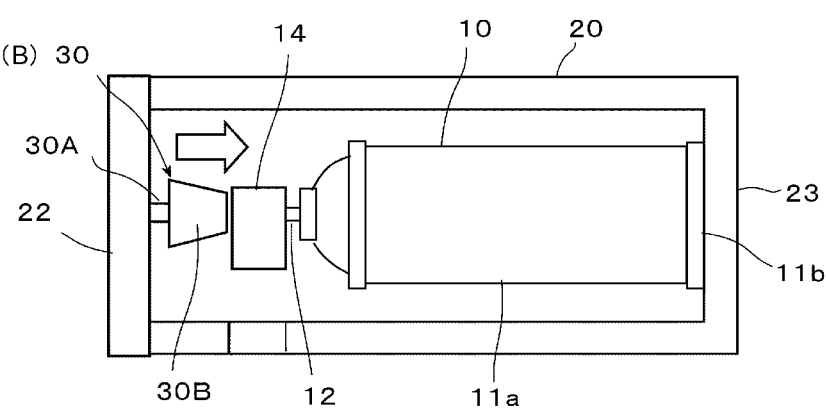

FIG. 3(B) shows a configuration in which the aerosol container 10 is fixed to the sleeve 20, and the stem 12 is pushed down by the discharge drive unit 30 via the actuator 14. That is, the discharge drive unit 30 drives the contact member 30B in contact with the actuator 14 in the direction of being pushed down by the drive unit 30A.

In this way, the mechanical mechanism can be concentrated on one side of the aerosol container 10, so that the structure becomes compact and easy to replace. Moreover, it can be used for aerosol containers 10 of various heights.

Here, note that the configuration of the drive unit 30A in FIGS. 3(A) and 3(B) may be a mechanism that drives in a linear direction, and a motion conversion mechanism such as a cam or a screw feed mechanism that converts the rotational motion of a rotary motor into a linear direction can be used, or a linear motor for linear drive, an electromagnetic solenoid or the like can be used instead of the rotary motor.

Figure 3C:
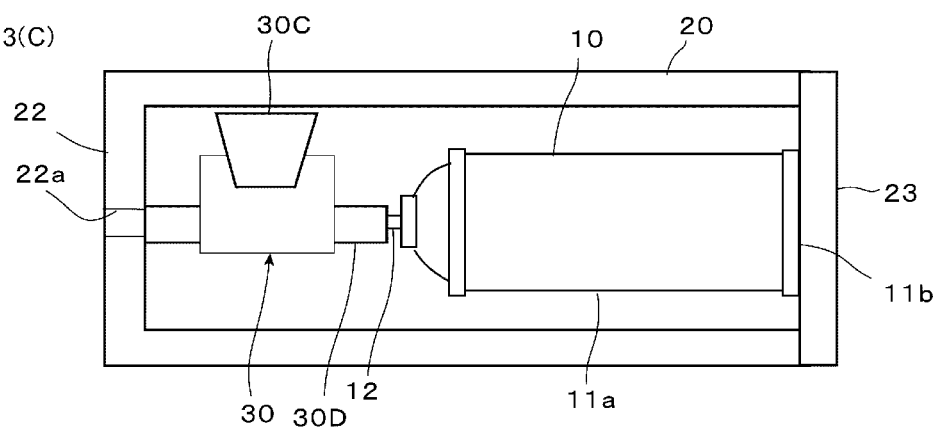

FIG. 3(C) shows that control is performed not by a valve inside the aerosol container 10 but by an external valve 30C. In the figure, the external valve 30C is described conceptually, and can be configured to be driven to open and close by a solenoid valve or the like. When the external valve 30C is used, it is easy to install or mount the aerosol container 10 and also easy to control the opening and closing of the valve, since the stem 12 of the aerosol container 10 is simply connected to a pipe conduit 30D. In the case of using the existing aerosol container 10, for example, it is configured such that when assembling the aerosol container 10, the stem 12 is pushed in so as to hold the internal valve in a normally open state.

[Electric Equipment]

Next, referring back to FIG. 1(A), electric equipment for driving the discharge drive unit 30 and the stirring device 70 will be described. FIG. 1(A) conceptually illustrates the electric equipment that is mounted on the aerial vehicle.

A discharge apparatus control unit 210, which is a control device configured to control the discharge drive unit 30 and the stirring device 70, is provided separately from a flight control unit 110, which controls the flight of the aerial vehicle 100, and is arranged on the side of the airframe 101 together with the flight control unit 110. In addition, a discharge apparatus power supply 211 for driving the discharge drive unit 30 and the stirring device 70 is provided separately from a power supply for driving the aerial vehicle 100 (which is assumed to be incorporated in the flight control unit 110 and is not illustrated) and is mounted on the side of the airframe 101.

Moreover, a discharge apparatus communication unit 212 including an antenna for remotely operating the discharge apparatus 1 is provided separately from a flight communication unit 112 including an antenna for remotely operating the aerial vehicle 100, and is mounted on the airframe 101.

A part or all of the flight control unit 110, the flight communication unit 112, and the flight power supply may have the roles of the discharge apparatus control unit 210, the discharge apparatus communication unit 212, and the discharge apparatus power supply 211. FIG. 2(C) illustrates an example in which a power supply arranged in the flight control unit 110 is shared.

[Structure for Supporting Airframe]

The discharge apparatus support portion 50 for supporting the discharge apparatus 1 on the airframe 101 of the aerial vehicle 100 may have a sliding engagement structure of a slide rail and a T-shaped groove or a structure that can be engaged and disengaged in a rotational direction such as bayonet coupling, or various support means, which facilitate removal and attachment, such as screwing, clip coupling, clamping, etc., may be applicable. The discharge apparatus support portion 50 may also be provided with a direction changing device such as a gimbal.

Also, the discharge apparatus support portion 50 may be provided with electrical contacts that electrically connect the discharge apparatus control unit 210 and the discharge apparatus power supply 211 arranged on the airframe 101 side to the motor 31 of the discharge drive unit 30 and the motor of the stirring device 70 or the like, or they may instead be directly connected to each other from the sleeve 20 to a connector arranged on the airframe 101 by means of a cable or the like. In addition, a power supply such as a secondary battery and a wireless communication device may be provided in the sleeve 20, and electric signals from the flight control unit 110 arranged on the airframe 101 side may be transmitted to and received from the discharge apparatus control unit 210 in the sleeve 20 by wireless communication.

Next, the operation of the discharge apparatus for an aerial vehicle according to the present invention will be described.

[Replacement Work]

In advance, a new aerosol container assembly 40 for replacement with an aerosol container 10 housed in a sleeve 20 has been prepared, as illustrated in FIG. 1(B). In the replacement work, the aerosol container assembly 40 is detached from the airframe fuselage 50, and the new aerosol container assembly 40 is attached. The discharge apparatus support portion 50 may have been configured, for example, such that it can be easily attached and detached by manual operation without using any tool, whereby the replacement thereof can be easily performed. After replacement, the aerosol container assembly 40 is disposed of by removing the aerosol container 10 from the sleeve 20 and completely releasing the gas and content therein. The sleeve 20 can be used repeatedly. Also, in this embodiment, only the aerosol container 10 can be replaced while the sleeve 20 is fixed to the airframe 101.

[Spraying Work]

Next, spraying work will be described with reference to FIG. 4. FIG. 4(A) is an explanatory view illustrating an example of remote operation of a control terminal and a discharge operation terminal for the aerial vehicle with the discharge apparatus mounted thereon, and FIG. 4(B) is a simple control block diagram thereof.

In the spraying work, for example, as illustrated in FIG. 4(A), the flight of the aerial vehicle 100 is remotely controlled by a control terminal 120, and the discharge apparatus 1 is remotely controlled by a discharge operation terminal 160. The operation terminal 160 is also used as a controller for a camera 106 mounted on the aerial vehicle 100. The discharge operation terminal 160 is provided, for example, with a discharge button 163, a stop button 164, a stirring button 165, and a stop button 166.

An operator presses the stirring button 165 before a discharge operation to stir the content in the aerosol container 10 for a certain period of time, so that the content is well mixed and made uniform.

That is, as illustrated in FIG. 4(B), when the stirring button 165 is pressed, a stirring command signal is transmitted. The stirring command signal is received by the discharge apparatus communication unit 212 mounted on the aerial vehicle 100, so that the stirring device 70 is driven and controlled by the discharge apparatus control unit 210, causing the aerosol container 10 to rotate. The rotation of the aerosol container 10 generates a swirling flow of the content inside the container, so that the content is stirred. When the stop button 166 is pressed, a stop command signal is transmitted, so that the motor 74 of the stirring device 70 is stopped, thus stopping the stirring.

After stirring, the content is discharged. That is, when the discharge button 163 is pressed while looking at an image on the display 167, a discharge command signal is transmitted so that it is received by the discharge apparatus communication unit 212 mounted on the aerial vehicle 100. Based on this discharge command signal, the discharge drive unit 30 is started to be driven by the discharge apparatus control unit 210, so that the stem 12 of the aerosol container 10 is pushed in to discharge the content therein. When the stop button 164 is pressed, a stop command signal is transmitted, so that the pushing of the stem 12 is released by the discharge drive unit 30 to stop the discharge.

The relationship between stirring and discharge can be controlled by the discharge apparatus control unit 210 as follows.

First Control Example

In a first control example, it is controlled such that upon starting a discharge operation, a stirring step of automatically stirring the content for a certain period of time is executed before the discharge, and the content in the aerosol container 10 is discharged after the stirring step.

That is, the discharge button 163 is pressed, so that a discharge command signal is inputted to the discharge apparatus control unit 210 via the discharge apparatus communication unit 212 of the aerial vehicle 100. The discharge apparatus control unit 210 drives the stirring device 70, and after the lapse of a predetermined period of time, stops the stirring device 70 and drives the discharge drive unit 30 to start the discharge operation, and continues the discharge operation until the stop button 166 is pressed. When the stop button 164 is pressed, a stop command signal is inputted to the discharge apparatus control unit 210 via the discharge apparatus communication unit 212, and a discharge stop signal is then outputted from the discharge apparatus control unit 210, so that the discharge drive unit 30 is stopped to stop the discharge.

The discharge apparatus control unit 210 has hardware resources such as a CPU, a memory, an interface, etc., although not specifically illustrated, and the CPU reads programs stored in the memory and executes a series of procedures as described above.

Second Control Example

As a second control example, the content in the aerosol container is discharged during the stirring step of stirring the content in the aerosol container.

That is, the discharge button 163 is pressed, so that a discharge command signal is inputted to the discharge apparatus control unit 210 via the discharge apparatus communication unit 212 of the aerial vehicle 100. The discharge apparatus control unit 210 first drives the stirring device 70. After a predetermined period of time elapses, the discharge drive unit 30 is driven to start a discharge operation without stopping the stirring device 70, and the discharge operation is continued until the stop button 166 is pressed. As a result, the content in the aerosol container is discharged during the stirring step.

When the stop button 164 is pressed, a stop command signal is inputted to the discharge apparatus control unit 210 via the discharge apparatus communication unit 212, and a discharge stop signal is outputted from the discharge apparatus control unit 210, so that the discharge drive unit 30 is stopped to stop the discharge operation.

A series of procedures executed by the discharge apparatus control unit 210 can be automatically processed by storing them in a memory as a program in advance.

Here, note that in this first embodiment, the stirring device 70 is configured to rotate the aerosol container 10, wherein the aerosol container 10 is moved in the axial direction while being rotated, thereby to press the flange portion 14*b* of the actuator 14 against the pressing member 221, so that frictional torque is generated in the contact area. However, if a friction holding torque between the container holding portion of the stirring device 70 and the bottom portion 11*b* of the aerosol container 10 is set to be large, it is possible to discharge the content while rotating the aerosol container.

Third Control Example

As a third control example, it is controlled so that a plurality of discharges are continuously performed at intervals. That is, stirring, discharging, stirring, and discharging are repeatedly and continuously performed.

When the discharge button 163 is pressed and a discharge command signal is inputted to the discharge apparatus control unit 210 via the discharge apparatus communication unit 212 of the aerial vehicle 100, the stirring device 70 is driven, and after a predetermined period of time elapses, the stirring device 70 is stopped and the discharge drive unit 30 is driven to start the discharge operation. Further, when a predetermined period of time has passed, the discharge drive unit 30 is stopped and the stirring device 70 is driven again to stir. This procedure of stirring and discharging is repeated until the stop button 166 is pressed, and the procedure is stopped when the stop button 166 is pressed.

In this way, the content to be discharged can be kept more homogeneous.

In addition, switching between discharge and stop can be performed not only by manual operation of an operation unit such as a button, but also by automatic switching according to a program stored in advance. For example, a flight route may have been programmed in advance, and a position on a map may be detected by signals from a GPS satellite and a height may be detected by an altimeter, so that discharge can be started when a predetermined position is reached, and the discharge can be stopped when the discharge in a predetermined area has been completed, wherein a stirring step may be incorporated before this discharge operation.

Next, other embodiments of the present invention will be described. In the following description, only differences from the above-mentioned embodiments will be mainly described, wherein the same components will be denoted by the same reference signs, and the description thereof will be omitted.

Second Embodiment of First Invention

FIG. 5 illustrates a discharge apparatus for an aerial vehicle according to a second embodiment of the first invention. FIG. 5(A) is a cross-sectional view of a discharge apparatus for an aerial vehicle, and FIGS. 5(B) and 5(C) are views illustrating main components, wherein FIG. 5(B) is an explanatory view of a stirring step, and FIG. 5(C) is an explanatory view of a discharge step.

A stirring device 270 of this second embodiment is different from that of the first embodiment in that, as illustrated in FIG. 5(A), a container center axis N of an aerosol container 10 is eccentric with respect to a rotation center axis M of a motor 271, so that the content in the aerosol container 10 is stirred by swinging (turning) the aerosol container 10 about the rotation center axis M.

That is, as illustrated in FIG. 5(B), a rotation center axis M of a power transmission plate 275, which is driven to rotate by the motor 271 of the stirring device 270, matches a center axis of a sleeve 20, and a connecting shaft portion 72c of a container holding portion 72 is connected to the power transmission plate 275 at an eccentric position away by a predetermined distance from this rotation center axis M in a direction perpendicular thereto. This connecting shaft portion 72c is configured to coincide with the container center axis N of the aerosol container 10, and the container center axis N of the aerosol container 10 is configured to be eccentric by the predetermined distance from the rotation center axis M.

On the other hand, on the head side of the aerosol container 10, a stem 12 is eccentric from the rotation center axis M, so that the stem 12, a main body portion 14a of an actuator 14 connected to the stem 12, and a connecting tube 16 connected to the main body portion 14a also swivel or turn. Therefore, a tubular body 2221a of a pressing member 2221 is expanded in diameter so as not to interfere with the swivel or turning portions, and the tubular body 2221a fixed to a first end cover portion 22 is provided at its one end with an inward flange portion 2221b that has a hole formed therein with its hole diameter narrowed to about an outer diameter of the connecting tube 16.

In addition, a flange portion 14b of the actuator 14 is made wider to expand its contact range with the tubular body 2221a of the pressing member 2221, so that the actuator 14 can be held in the axial direction. Further, an end of the connecting tube 16 inserted into the tubular body 2221a of the pressing member 2221 is bent by the inward flange portion 2221b so as to be inclined from its portion held on the rotation center axis M toward its connecting end with the main body portion 14a of the actuator 14.

Stirring Step

When stirring, as illustrated in FIG. 5(B), similarly to the first embodiment, the discharge operation by a discharge drive unit 30 is not performed, and the motor 271 of the stirring device 270 is rotationally driven in a state where the movable plate 32b is at a retracted limit position and the aerosol container 10 is maintained in a closed valve state. When the motor 271 is rotated, the aerosol container 10 turns around the rotation center axis M via the power transmission plate 275 and the connecting shaft portion 72c to stir the content. In the case of this second embodiment, the aerosol container 10 does not rotate on its own axis but only swivels or turns, and the actuator 14 and a connecting end portion of the connecting tube 16 connected with the actuator 14 also turn. For the connecting tube 16, the connecting end portion thereof with the actuator 14 performs a precession around a contact portion thereof with the inward flange portion 2221b of the pressing member 2221, whereas a portion of the connecting tube 16 protruding outward from the sleeve 20 is held at a position on the rotation center axis.

Discharge Step

In a discharge step, as illustrated in FIG. 5(C), the stirring device 270 is stopped and the discharge drive unit 30 is operated. That is, a cam 32a is rotated by a discharge motor 31 to move the aerosol container 10 forward in the axial direction. This movement of the aerosol container 10 causes the actuator 14 attached to the stem 12 to move in the axial direction toward the actuator 14 held by the tubular body of the pressing member 2221. Then, the stem 12 is pushed into the aerosol container 10 by a reaction force from the side of the actuator 14 to open a valve, whereby the content is discharged.

Third Embodiment of First Invention

FIG. 6 illustrates a discharge apparatus for an aerial vehicle according to a third embodiment of the first present invention. FIG. 6(A) is a cross-sectional view of the discharge apparatus, FIG. 6(B) is a view showing main components of the discharge apparatus, FIG. 6(C) is an explanatory view of a stirring step, and FIG. 6(D) is an explanatory view of a discharge step.

This third embodiment is different from the first embodiment in that a stirring device 370 is configured to stir the content in an aerosol container by reciprocating the aerosol container.

That is, as illustrated in FIGS. 6(A) and 6(B), the stirring device 370 is arranged in series between a discharge drive unit 30 and an aerosol container 10 in a second end cover portion 23. A frame 301 of the discharge drive unit 30 is fixed to the second end cover portion 23 of a sleeve 20, and is connected to the aerosol container 10 through the stirring device 370, so that the aerosol container 10 is driven through the stirring device 370 by a predetermined discharge stroke (a stroke for opening a valve in the container). On the other hand, the stirring device 370 is configured to reciprocate the aerosol container 10 in a state before the discharge operation of the discharge drive unit 30, i.e., in a state where the aerosol container 10 is in a closed valve state and does not reach a discharge stroke.

The stirring device 370 has a movable frame 371 that is movable in the axial direction, and the discharge drive unit 30 has a movable plate 32b connected to the movable frame 371. A motor 372, which is a rotational drive source, and a cam mechanism 373, which is a motion conversion mechanism for converting the rotational motion of the motor 372 into linear motion, are attached to the movable frame 371, wherein a container holding portion 72, which holds the aerosol container 10, is caused to move linearly by means of the cam mechanism 373.

Similarly to the discharge drive unit 30, the cam mechanism 373 includes a cam 373a that is rotatably driven by the motor 372 and a cam follower 373b that moves in a linear direction due to the rotation of the cam 373a, wherein the cam follower 373b is connected to the container holding portion 72.

Stirring Step

In a stirring step, as illustrated in FIGS. 6(B) and 6(C), the stirring device 370 is driven in a state where a cam 32a of the discharge drive unit 30 is at a non-discharge position (closed valve position).

When the stirring device 370 is driven, the cam 373a is rotated by the motor 372, so that the aerosol container 10 is caused to reciprocate through the cam follower 373b and the container holding portion 72. Thus, the content in the aerosol container 10 is stirred while being swung or shaken in the axial direction. After stirring for a predetermined period of time, the stirring is stopped. In the stopped state, the cam follower 373b comes into contact with a minimum diameter portion of the cam of the stirring device.

Discharge Step

In a discharge step, as illustrated in FIG. 6(D), in a state where the stirring device 370 is stopped, the cam 32a is driven to rotate by the motor 31 of the discharge drive unit 30 whereby the movable plate 32b is driven to move linearly through the cam follower 32c, as a result of which the aerosol container 10 is caused to move linearly by means of the movable plate 32b through the stirring device 370, so that the stem 12 is pushed in by the actuator 14 by a predetermined amount, thereby discharging the content.

Modification of Third Embodiment

FIG. 7 illustrates a modification of the third embodiment. FIG. 7(A) is a cross-sectional view of a discharge apparatus for an aerial vehicle, and FIG. 7(B) is a view illustrating main components, FIG. 7(C) is an explanatory view of a stirring step, and FIG. 7(D) is an explanatory view of a discharge step of FIG. 7(B).

In this third embodiment, the stirring device of the cam mechanism of the second embodiment is omitted, and a cam mechanism of a discharge drive unit 330 is used as a stirring device.

Figure 7A:
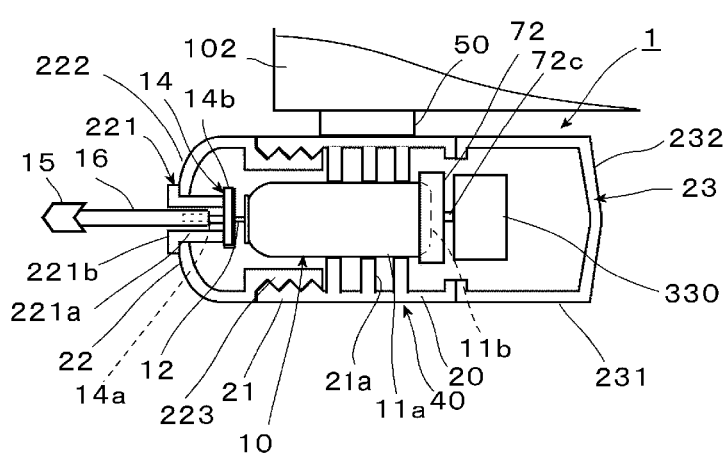
Figure 7B:
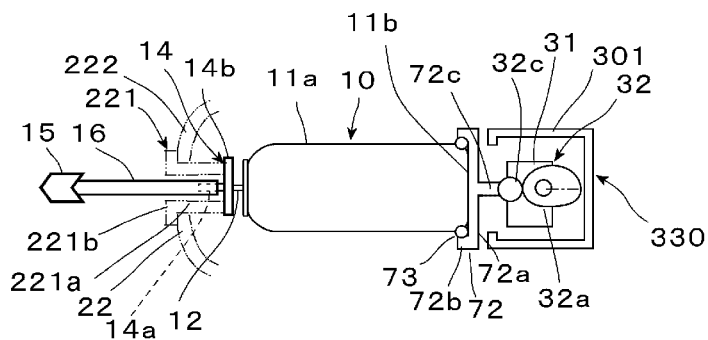

As illustrated in FIGS. 7(A) and 7(B), similarly to the discharge drive units 30 of the first and second embodiments, the configuration of the discharge drive unit 330 includes a motor 31, which serves as a rotational drive source, and a cam mechanism 32, which converts the rotation of the motor 31 into a linear motion of a movable plate 32b connected to a stirring device 70. The motor 31 and the cam mechanism 32 are assembled to a frame 301 fixed to a second end cover portion 23. The cam mechanism 32 is composed of a cam 32a that is driven to rotate by the motor 31 and a container holding portion 72 that supports a bottom portion 11b of an aerosol container 10, wherein the container holding portion 72 is provided with a cam follower 32c that moves along a cam surface of the cam 32a.

Figure 7C:
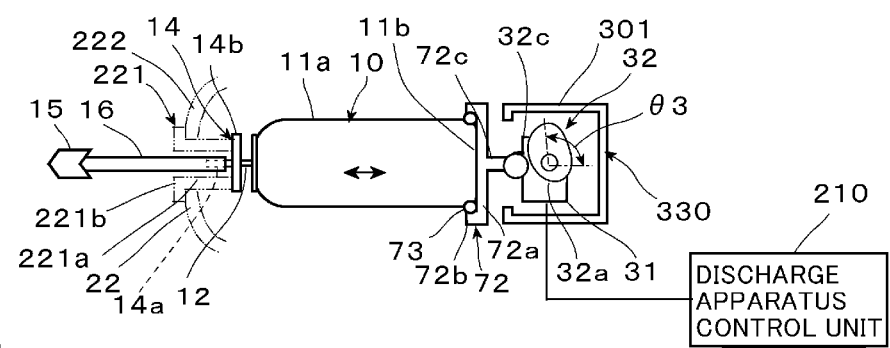

In the stirring step, as illustrated in FIG. 7(C), a rotation angle θ1 of the cam 32a of the discharge drive unit 30 is reduced, so that the aerosol container is caused to reciprocate within a range where the stroke thereof is shorter than the discharge stroke, whereby the content is vibrated and stirred without being discharged.

Figure 7D:
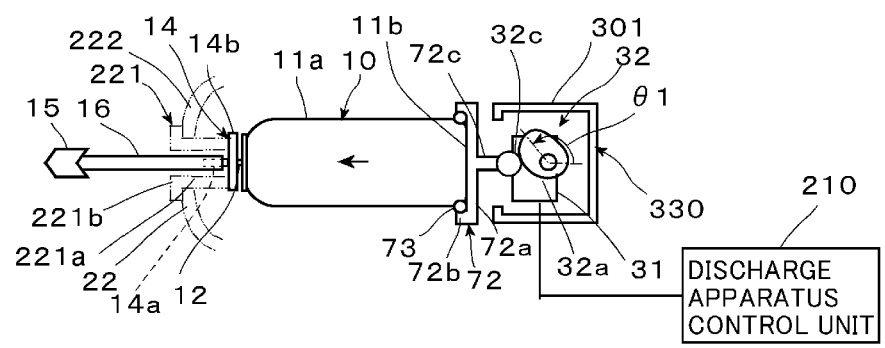

On the other hand, at the time of discharge, as illustrated in FIG. 7(D), the discharge drive unit 30 is controlled such that a rotation angle θ2 of the cam 32a of the discharge drive unit 30 is increased to move the aerosol container by the discharge stroke thereby to perform the discharge operation.

Such driving of the cam 32a is performed by a discharge apparatus control unit 210. That is, the rotation angle θ2 of the cam 32a in the stirring step and the rotation angle θ1 of the cam 32a in the discharge step have been set in advance, so that the driving of the motor 31 that rotates the cam 32a is controlled. The rotation angle of the cam 32a is controlled by detecting a rotation angle thereof from an origin position by a rotary encoder built in the motor 31, for example.

Fourth Embodiment of First Invention

Figure 8A:
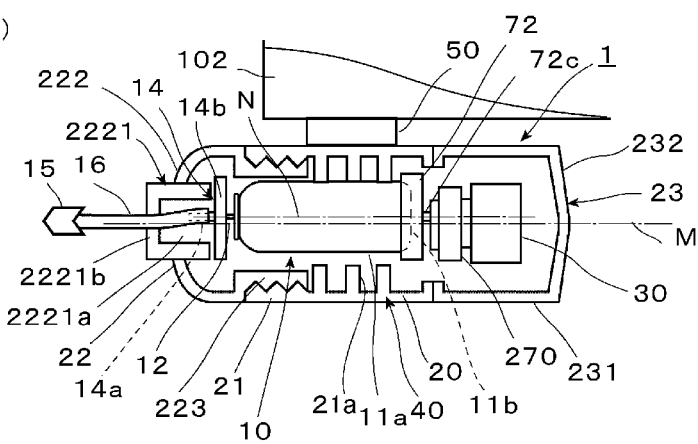
Figure 8B:
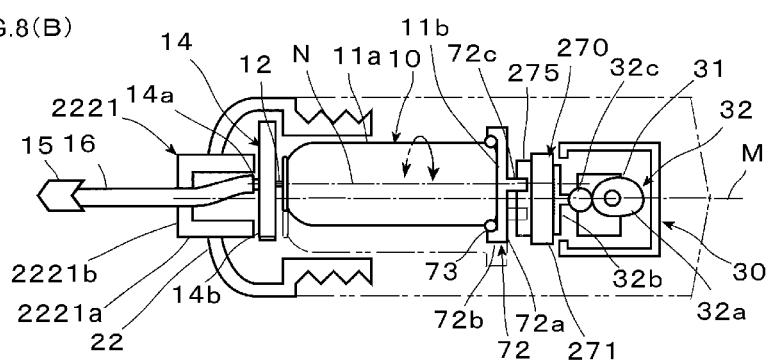
Figure 8C:
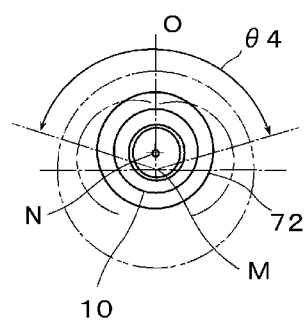

FIG. 8 illustrates a discharge apparatus for an aerial vehicle according to a fourth embodiment of the present invention, wherein FIG. 8(A) is a cross-sectional view of the discharge apparatus, FIG. 8(B) is an explanatory view of a stirring step, and FIG. 8(C) is a view of an aerosol container of FIG. 8(B) as seen from a central axis direction.

In this fourth embodiment, the aerosol container is configured to be swung or shaken to stir its content.

As illustrated in FIGS. 8(A) and 8(B), the basic configuration is the same as that of the second embodiment. This embodiment is different from the second embodiment in that a motor 31 is configured not to be continuously rotated, but to have a swing mode in which the direction of rotation thereof is reversed within a range of a swing angle θ4 of 360 degrees or less, as illustrated in FIG. 8(C). By repeating the reverse motion in the direction of rotation in this way, a swirl flow is reversed so that stirring can be efficiently performed.

In the control of the motor 31, for example, a rotation angle thereof from an origin position O is detected by a rotary encoder built in the motor 31, and the motor is reversely rotated at every predetermined angle.

Fifth Embodiment of First Invention

Figure 9A:
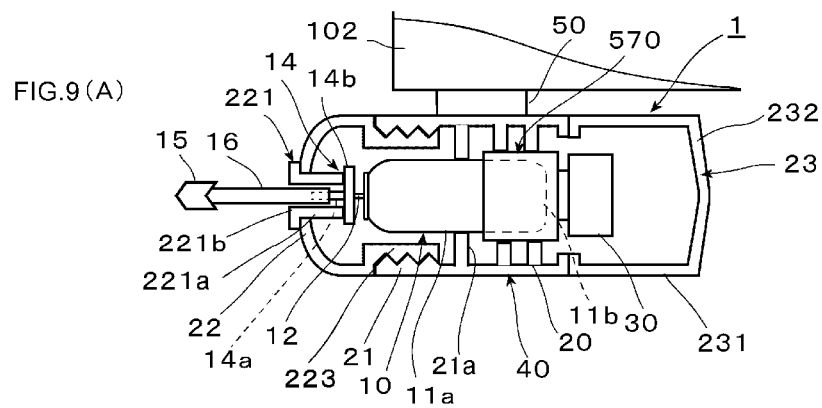
Figure 9B:
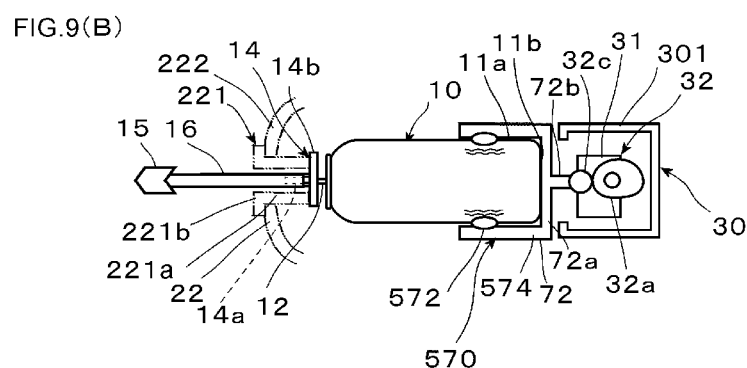
Figure 9C:
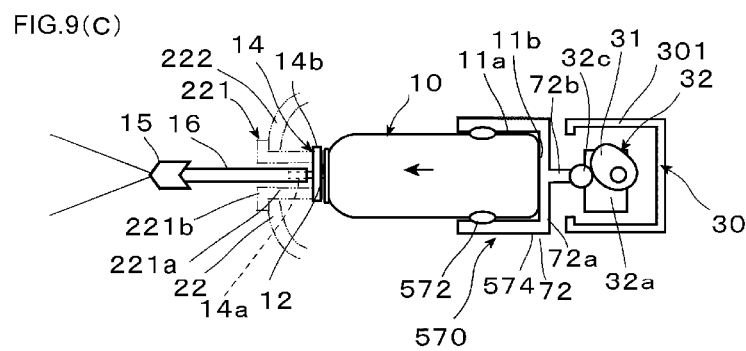

FIG. 9 illustrates a discharge apparatus for an aerial vehicle according to a fifth embodiment of the present invention, wherein FIG. 9(A) is a cross-sectional view of the discharge apparatus, FIG. 9(B) is an explanatory view of a stirring step, and FIG. 9(C) is an explanatory view of a discharge step.

In this fifth embodiment, a stirring device 570 is configured to vibrate an aerosol container by means of a vibrator in the form of an ultrasonic vibrator 572, thereby to vibrate and stir the content therein.

In this example, a container holding portion 72 of a discharge drive unit 30 holding an aerosol container 10 is provided with a tubular portion 574 that holds a body portion 11a of the aerosol container 10 by a predetermined length, and the ultrasonic vibrator 572 is arranged on an inner periphery of the tubular portion 574, which is brought into contact with the body portion 11a of the aerosol container 10. With the use of the ultrasonic vibrator 572, the content will be accelerated at the molecular level so that a stirring effect will be high.

Stirring Step

In a stirring step, as illustrated in FIG. 9(B), the ultrasonic vibrator 572 is caused to vibrate to stir the content in a state where the discharge drive unit 30 stops the discharge.

Discharge Step

In a discharge step, as illustrated in FIG. 9(C), the discharge drive unit 30 is driven to move the aerosol container 10 in the axial direction in a state where the ultrasonic vibrator 572 is stopped, so that the content is discharged, as in the first embodiment.

Sixth Embodiment of First Invention

Figure 10:
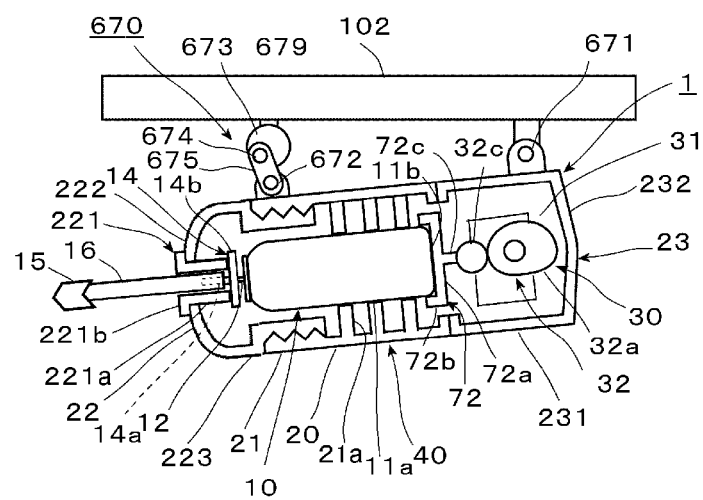

FIG. 10 is a cross-sectional view of a discharge apparatus for an aerial vehicle according to a sixth embodiment of the present invention.

In this sixth embodiment, the configuration of a discharge drive unit 30 is the same as in the first embodiment, and the difference is that a stirring device 670 is configured to swing or shake an entire aerosol container assembly 40 in which an aerosol container 10 is housed in a sleeve 20.

In other words, the sleeve 20 is supported at two points, a fixed fulcrum 671 and a movable fulcrum 672, against an airframe underside of the aerial vehicle so as to be swingable around the fixed fulcrum 671. The movable fulcrum 672 is configured to be connected to an eccentric shaft 674 of a drive plate 673 provided on an airframe 101 through a link 675, so that the drive plate 673 can be driven to rotate by an unillustrated motor thereby to swing the movable fulcrum 672.

When the aerosol container 10 is caused to swing, the orientation of a nozzle 15 changes, so that it is set to be a fixed direction, e.g., a horizontal direction, at the time of discharge.

Seventh Embodiment of First Invention

Figure 11A:
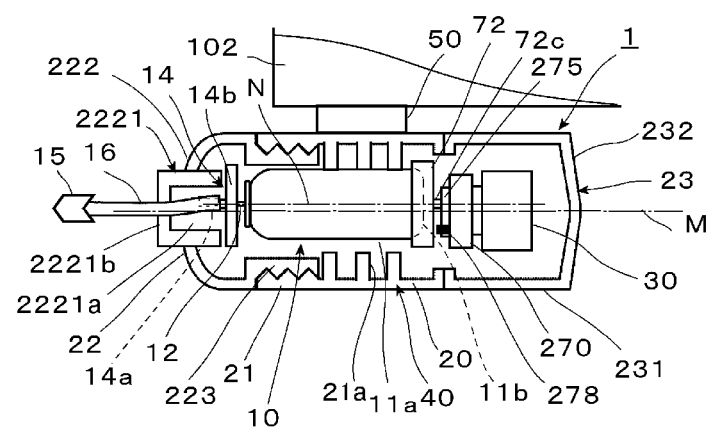
Figure 11B:
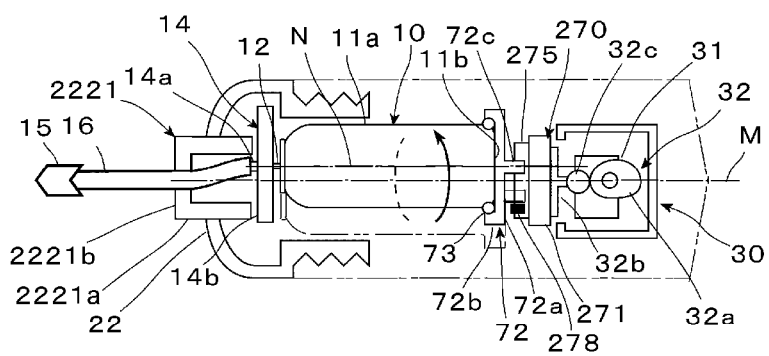

FIG. 11 illustrates a discharge apparatus for an aerial vehicle according to a seventh embodiment of the present invention, wherein FIG. 11(A) is a cross-sectional view of the discharge apparatus, and FIG. 11(B) is an explanatory view of a stirring step.

In this seventh embodiment, the basic configuration is the same as that of the second embodiment, as illustrated in FIGS. 11(A) and 11(B). The difference is that a means is provided to offset a reaction force generated by the stirring of a stirring device 270.

Specifically, a weight (balance weight) 278 for offsetting a reaction force generated during eccentric rotation is provided on a power transmission plate 275 of the stirring device 270.

In other words, an aerosol container 10 turns with respect to a rotation center axis M, so that a centrifugal force thereof acts on an aerial vehicle 100, causing the aerial vehicle 100 to move. Therefore, the weight 278 is arranged at a position of the power transmission plate 275 symmetrical to a connecting shaft with respect to the rotation center axis M so as to balance the centrifugal force acting on the aerosol container 10. The position and mass of the weight 278 are appropriately selected so as to balance the centrifugal force acting on the aerosol container 10.

In this way, even in an eccentric state, the reaction force acting on the aerial vehicle can be offset, thereby stabilizing the aerial vehicle.

Other Embodiments of First Invention

In the above-mentioned first through seventh embodiments, it is configured such that the aerosol container 10 is caused to move relative to the airframe 101 of the aerial vehicle 100 by being rotated, reciprocated, swung, vibrated, etc., thereby to vary the inertial force of the content in the aerosol container 10 to stir the content, but instead, the airframe 101 itself may be caused to rotate, reciprocate, swing, etc., so that the content in the aerosol container 10 can be stirred. That is, a stirring mode is provided in a flight mode, and when the stirring mode is executed, the individual motors of the rotor blades are controlled to perform a stirring operation for a fixed period of time. For example, if the airframe is caused to rotate around its yaw axis, the aerosol container can be turned around the yaw axis; if the airframe is repeatedly caused to rotate forwardly and reversely, the aerosol container can be swung; and if the airframe is repeatedly caused to move forward and backward, the aerosol container can be reciprocated. Such movements may have been programmed in advance as the stirring mode, and when a stirring button is pressed, the stirring mode is executed, so that the stirring operation can be performed. In this case, the flight control unit of the aerial vehicle constitutes a stirring means.

Here, note that in the above-mentioned embodiments, the aerosol container is housed in the sleeve and mounted on the aerial vehicle, but it does not necessarily have to be housed in the sleeve, and for example, the aerosol container may be mounted on the aerial vehicle by a gripping means configured to grip the body portion of the aerosol container. That is, the aerosol container may be mounted on the aerial vehicle in a state of being exposed to an external space, and the stirring device may be configured to move the aerosol container to stir its content. As the stirring device, a mechanism for rotation, turning, reciprocation, vibration, swinging, or the like can be appropriately selected with the gripping means.

In addition, in each of the above-described embodiments, an example has been described in which a multicopter is used as an aerial vehicle on which a liquid material discharge apparatus is mounted, but a discharge apparatus for a moving vehicle of the present invention can be applied to not only a helicopter but also an unmanned aircraft such as a fixed-wing aircraft, an airship, a gliding aircraft, etc., in addition to an aerial vehicle using rotor blades (rotors), and can also be applied to not only an unmanned but also a manned aircraft. Further, the present invention can be widely applied not only to aerial vehicles but also to various types of unmanned or manned moving vehicles such as vehicles traveling on tracks, vehicles traveling on road surfaces, ships moving on water, submarines moving underwater, and the like.

Next, a temperature adjusting device for an aerosol container according to the second invention will be described in detail based on embodiments illustrated in the drawings.

Since the configuration of an aerial vehicle itself in a discharge apparatus for an aerial vehicle is as described in the first embodiment of the first invention, the description thereof will be omitted. In the following description, the configuration of the discharge apparatus to which the temperature adjusting device for an aerosol container is applied will be described. Since the basic configuration of the discharge apparatus is the same as that of the first embodiment of the first invention, only portions different from the first embodiment of the first invention will be mainly described, and the same components will be denoted by the same reference signs and the description thereof will be omitted.

First Embodiment of Second Invention

First, a first embodiment of the second invention will be described.

Figure 12:
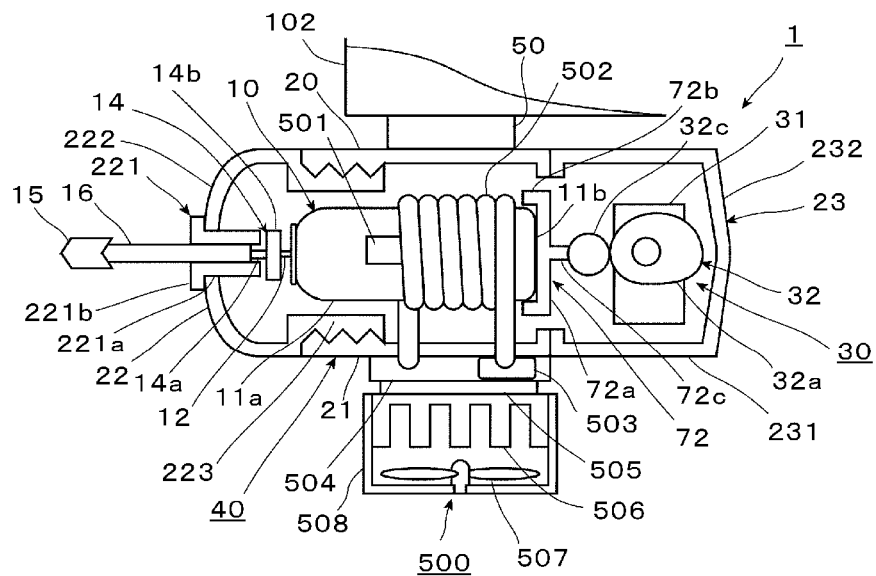

FIG. 12 is a cross-sectional view of a discharge apparatus for an aerial vehicle to which a temperature adjusting device for an aerosol container according to the first embodiment of the second invention is applied.

In a sleeve 20, a discharge drive unit 30 for discharging a content from an aerosol container 10 and some components of a temperature adjusting device 500 are built or contained, and the remaining components of the temperature adjusting device are arranged outside the sleeve 20 and connected to the built-in components.

The temperature adjusting device 500 of the present embodiment includes a heat medium pipe 502 wound around a body portion 11a of the aerosol container 10 in a coil shape, a reservoir 504 for storing a heat medium such as water or the like, a pump 503 for supplying the heat medium in the reservoir 504 into the heat medium pipe 502 and circulating it back to the reservoir 504, a Peltier element 505 for heating and cooling the heat medium in the reservoir 504, and a temperature sensor 501 for detecting the temperature of the aerosol container 10. In addition, it also includes a heat sink 506 for radiating heat from the Peltier element 505 and a fan 507 for cooling the heat of the heat sink 506.

The Peltier element 505 is connected to the sleeve 20 through the reservoir 504, so that it cools or heats the heat medium in the reservoir 504. The Peltier element 505 is connected to an unillustrated power source through electric wiring, and is switched between a heating state and a cooling state by changing the polarity of a direct current to be supplied according to electric control.

Warm heat or cold heat generated by the Peltier element 505 is transmitted to the aerosol container 10 by the heat medium flowing through the heat medium pipe 502. The heat medium is a fluid such as water, LLC (Long Life Coolant), or the like. The heat medium is circulated by the operation of the heat medium pump 503 in a circulation path that is composed of the reservoir 504 acting as a tank and the heat medium pipe 502 in contact with the aerosol container 10.

Of the two sides of the Peltier element 505, when a contact surface thereof in contact with the reservoir 504 is in a heated state, the Peltier element 505 functions as a heating means. On the other hand, when the contact surface is in a cooled state, the Peltier element 505 functions as a cooling means.

The heat medium pipe 502 of the temperature adjusting device 500 inside the sleeve 20 is arranged so as to come into contact with the aerosol container 10 when the aerosol container 10 is housed therein. The heat medium pipe 502 is preferably made of a material having elasticity and high thermal conductivity so as to be able to cope with aerosol containers of various sizes and shapes. In addition, in order to increase the contact area of the heat medium pipe with the aerosol container 10, it is preferable that the adjacent turns of the pipe are connected in contact with each other to form a spiral tubular structure. With the use of an elastic material as the heat medium pipe 502 in this manner, even when the aerosol container 10 is moved back and forth in the axial direction in order to discharge the liquid material therein, the heat medium pipe 502 expands and contracts so as to follow the movement of the aerosol container 10, so that the contact between the aerosol container 10 and the temperature adjusting device 500 can be maintained.

The heat sink 506 and the fan 507 of the temperature adjusting device 500 are arranged on a surface of the Peltier element 505 that is not in contact with the reservoir 504. Thus, for example, when the aerosol container 10 is cooled, the heat generated from the non-contact surface of the Peltier element can be released to the outside of the sleeve 20.

In addition, fine control can be made by switching the state of the Peltier element 505 using temperature information obtained by the temperature sensor 501, which is a temperature obtaining means. As the temperature sensor 501, there can be used any one such as a thermistor type, a thermocouple type, a digital type or the like. Those components of the temperature adjusting device 500 which are arranged outside the sleeve are preferably housed in a housing 508.

Here, note that in the illustrated example, the temperature adjusting device 500 heats the body portion of the aerosol container 10 (i.e., a portion of the aerosol container 10 that is not a tip portion thereof including a nozzle).

In cases where such a temperature adjusting device 500 for heating the body portion is applied to an aerosol container 10 of a type in which discharge is performed using compressed gas, when such an aerosol container using compressed gas is heated, an amount of rise in the internal pressure therein is moderate and the body portion thereof is safer against rapid heating, and hence, there is an advantage that temperature adjustment can be performed safely and efficiently by heating the body portion.

In addition, when such a temperature adjusting device 500 is applied to an aerosol container 10 using liquefied gas, the benefit of temperature adjustment can be preferably enjoyed.

That is, in the aerosol container using liquefied gas, when the temperature thereof becomes equal to or higher than a certain temperature (generally, 40 degrees Celsius or lower is recommended), the possibility of container deformation and gas leakage due to an increase in gas pressure increases, and thus the effect of the temperature adjustment is high. Moreover, continuous injection of the liquefied gas lowers the temperature inside the container by depriving it of heat of vaporization, which causes a drop in the internal gas pressure, thus increasing the possibility that the content will be discharged in unexpected places because a prescribed discharge distance cannot be secured, and hence, temperature adjustment is still highly effective.

As described above, the temperature adjusting device 500 of the present invention can be applied to various types of aerosol containers such as those using compressed gas, liquefied gas or the like, and in any case, a desirable effect can be obtained.

Figure 13A:
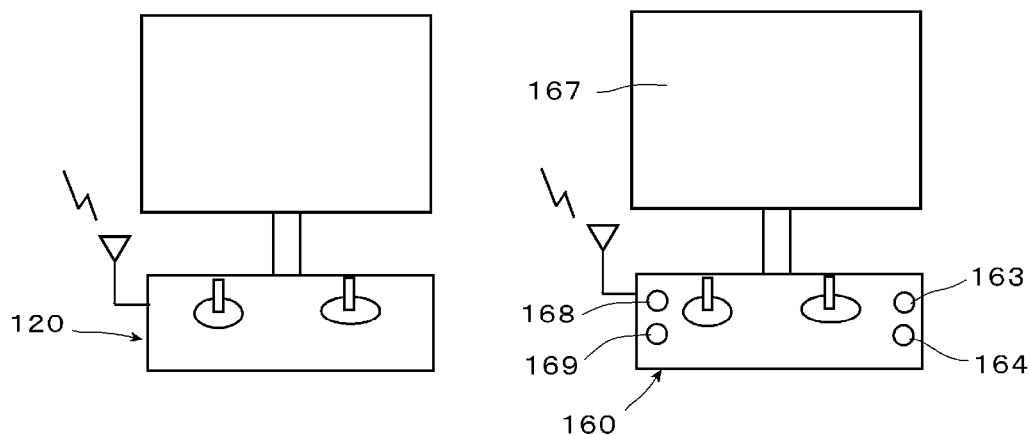
Figure 13B:
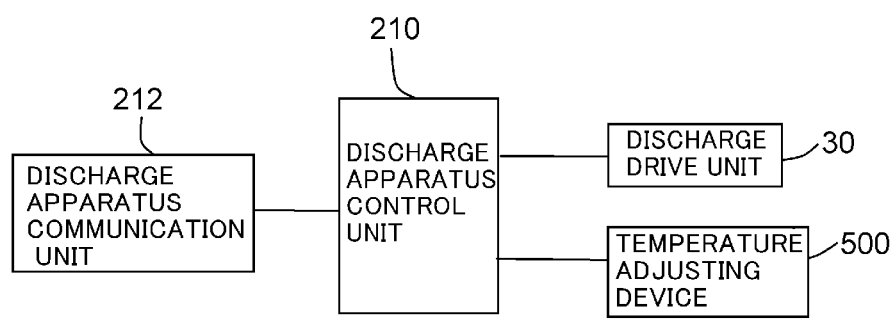
Figure 14A:
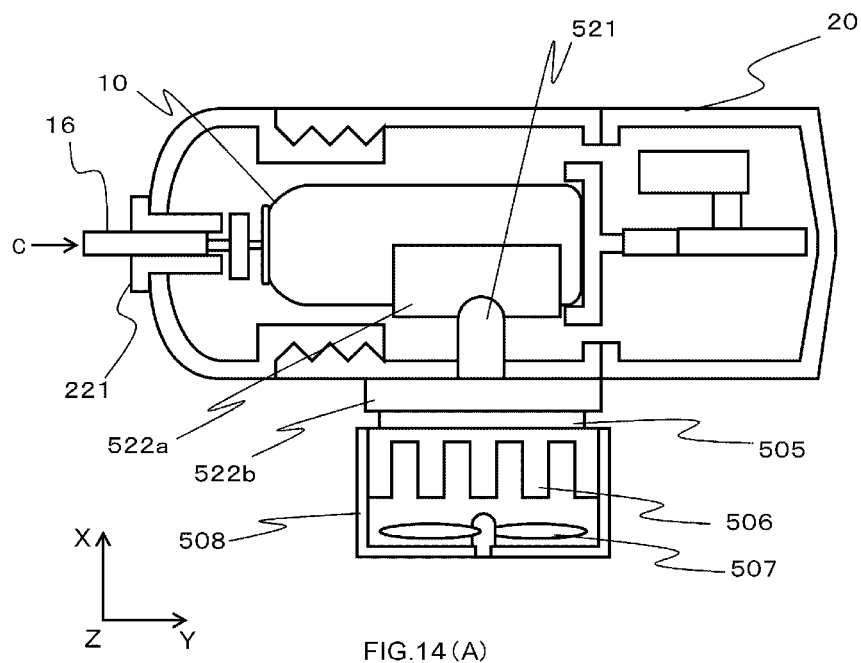
Figure 14B:
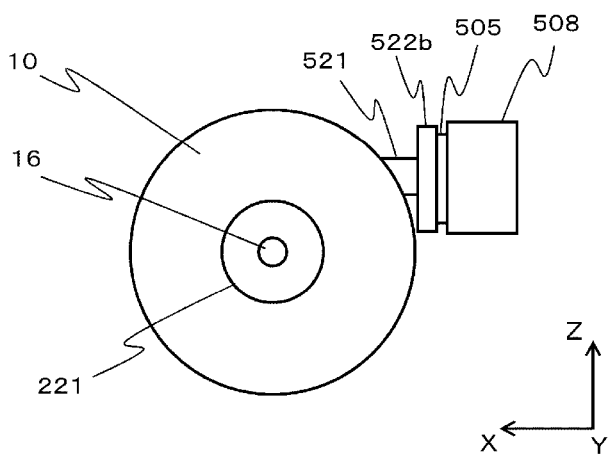
Figure 15:
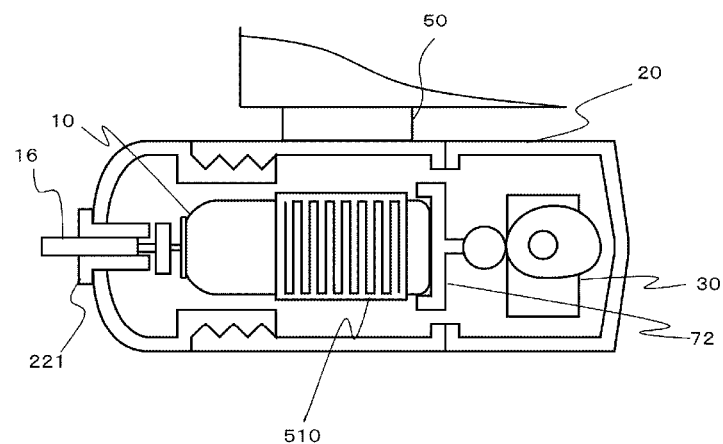

Next, spraying work with temperature adjustment will be described with reference to FIG. 13. FIG. 13(A) is an explanatory view illustrating an example of remote operation of a control terminal and an operation terminal for an aerial vehicle with a discharge apparatus mounted thereon, and FIG. 13(B) is a simple control block diagram thereof.

First Control Example

In the spraying work, for example, as illustrated in FIG. 13(A), the flight of the aerial vehicle 100 is remotely controlled by a control terminal 120, and the discharge apparatus 1 is remotely controlled by a discharge operation terminal 160. The operation terminal 160 is also used as a controller for the camera 106 mounted on the aerial vehicle 100. The operation terminal 160 is provided with, for example, a discharge button 163, a stop button 164, a heating button 168, a cooling button 169, and a display 167.

When the discharge button 163 is pressed, a discharge command signal is transmitted, and it is received by a discharge apparatus communication unit 212 mounted on the aerial vehicle 100. Based on this discharge command signal, a discharge drive unit 30 is started to be driven by a discharge apparatus control unit 210, so that the stem 12 of the aerosol container 10 is pushed in to discharge the content therein. When the stop button 164 is pressed, a stop command signal is transmitted, so that the pushing of the stem 12 is released by the discharge drive unit 30 to stop the discharge.

Then, when an operator decides to heat or cool by referring to the current temperature information obtained by the temperature sensor 501 and shown on the display 167, for example, the operator presses the heating button 168 or the cooling button 169. As a result, a temperature adjustment command signal is transmitted, and it is received by the discharge apparatus communication unit 212 mounted on the aerial vehicle 100. The temperature adjusting device 500 is driven by the discharge apparatus control unit 210, so that a direct current of a predetermined polarity is applied to the Peltier element 505 to start heating. Similarly, when cooling is performed instead of heating, the Peltier element 505 cools in response to the pressing of the cooling button 169 by the operator.

Second Control Example

Instead of controlling the temperature by the operator himself or herself using the heating button 168 and the cooling button 169, an input means (e.g., a numeric keypad)

for inputting a target temperature may be provided in the operation terminal 160. In this case, the target temperature input by the operator from the operation terminal 160 is received by the discharge apparatus communication unit 212. Then, the discharge apparatus control unit 210 controls the temperature adjusting device 500 by controlling the energized state of the Peltier element 505 so as to reach a set target temperature through feedback control based on the temperature information detected by the temperature sensor 501.

Instead of setting the target temperature by the operator, a standard temperature suitable for discharging the content may have been set in advance, and the discharge apparatus control unit 210 may continue the control so as to maintain the standard temperature.

Third Control Example

The discharge control unit 210 of this control example functions as an internal pressure calculation means configured to calculate the internal pressure of the aerosol container 10 and as a control content determining means configured to determine control contents (e.g., setting of the target temperature, heating or cooling control, etc.) by the temperature adjusting device 500 based on the calculated internal pressure. The method for calculating the internal pressure is optional, but when a general-purpose article is used as the aerosol container 10, a method capable of measuring from the outside of the container such as from the discharge apparatus 1, the sleeve 20, the airframe 101 or the like is preferable.

Here, the temperature and pressure of a gas when the volume thereof is constant are proportional to each other. Therefore, if the temperature of the aerosol container 10 changes due to a change in the altitude of the airframe 101 or a change in the climate, the internal pressure of the container may change, resulting in changes in the initial speed of discharge and spraying performance, which may prevent the desired spraying from taking place.

Therefore, in this control example, the container internal pressure is calculated based on the temperature of the aerosol container 10. The discharge apparatus control unit 210 obtains the temperature information of the aerosol container 10 measured by the temperature sensor 501. Since the temperature and pressure of a gas are in a proportional relationship as described above, the relationship between the temperature and the internal pressure can be obtained by referring to a relational expression or a table. Therefore, the discharge apparatus control unit 210 controls the temperature adjusting device 500 so that the compressed gas reaches a predetermined internal pressure. For example, if a temperature drop is measured and it is assumed that the internal pressure has decreased, the discharge apparatus control unit 210 performs heating control until the temperature reaches a level where a desired discharge pressure can be obtained.

The information for calculating the internal pressure, such as a mathematical formula or table indicating the relationship between the temperature and pressure of a gas, and the internal pressure or temperature of the aerosol container 10 that is suitable for exhibiting the desired spraying performance, may have been stored in a memory connected to the discharge apparatus control unit 210 in advance, or may be input to the discharge apparatus control unit 210 by the operator. The operation terminal 160 or the like may be used as an input means configured to input such information.

In this control example, the atmospheric pressure outside the aerosol container 10 may be further obtained and used for temperature adjustment. That is, in cases where the atmospheric pressure outside the aerosol container 10 changes due to a change in the altitude of the airframe 101 or a change in climate, the internal pressure of the container may also change, affecting the initial speed of discharge and spraying performance. Therefore, in this control example, the discharge apparatus control unit 210 obtains the atmospheric pressure information by using a method such as providing a barometer as an atmospheric pressure obtaining means in the airframe 101, or inputting the atmospheric pressure information by the operator via an input means, or the like, so that the temperature adjusting device 500 is controlled to adjust the internal pressure thereby to perform suitable discharge. In this case, too, a mathematical formula or a table including the relationship between the atmospheric pressure and the temperature can be stored in the memory for use.

Fourth Control Example

As the discharge operation continues, the content in the aerosol container 10 decreases. In the case of using an isolated type aerosol container 10 in which a liquid material is contained in an inner bag and a compressed gas is contained between the outer periphery of the inner bag and the inner periphery of the container main body, the rate or percentage of the compressed gas occupied in the container increases as the liquid material decreases, causing the compressed gas to expand. Then, since the gas pressure is inversely proportional to the volume when the mass is constant, the internal pressure of the container will gradually decrease as the compressed gas expands. The influence of the decrease in the internal pressure is small for a while after the start of discharge, but as the amount of discharge increases, the amount of decrease in the internal pressure also increases, so that the initial velocity of the liquid material at the time of discharge decreases, and the sprayability decreases.

Therefore, in this control example, the aerosol container is heated by the temperature adjusting device 500 in order to reduce the influence of the decrease in the internal pressure. In other words, since the temperature and pressure of a gas are proportional to each other when the volume is constant, heating the aerosol container increases the internal pressure and improves the pressure of the discharged material, thereby preventing a decrease in discharge performance.

In this control example, a method is adopted in which the remaining amount of the content is measured, the volume occupied by the compressed gas inside the container is calculated based on the remaining amount, and the internal pressure is calculated based on the volume.

Therefore, in this control example, it is configured such that the airframe 101 is provided with a weight sensor (not shown), and the weight of the discharge apparatus 1 including the aerosol container 10 is measured. The measurement can be performed periodically or every time the discharge apparatus control unit 210 instructs discharge and the liquid material is discharged. By comparing the weight before the start of the discharge operation with the weight at the time of measurement, the amount of the liquid material used and the remaining amount thereof can be calculated. Then, by calculating an amount of decrease in the volume of the liquid material inside the container based on the density of the liquid material, the volume of the compressed gas can be determined, thereby calculating the internal pressure. In this case, too, a mathematical formula or a table including the relationship between the remaining amount and the internal pressure can be stored in the memory for use.

As a method of calculating the remaining amount of the liquid material, it may be calculated based on the operation history of the discharge drive unit. That is, a timer is started by using a discharge command signal as a trigger, and the timer is terminated by a stop command signal to obtain a discharge period of time, which is then multiplied by a discharge amount per unit time to obtain an amount used. Then, the remaining amount is calculated by subtracting the amount used from an initial filled amount. This allows the internal pressure of the aerosol container 10 to be corrected to obtain a more accurate value.

As described above, according to the discharge apparatus described in the present embodiment, the temperature of the aerosol container 10 can be adjusted. As a result, the desired performance can be exhibited even when the external environment is an inappropriate temperature for the content in the aerosol container 10, such as an extremely high or low temperature. In addition, the desired performance can be exhibited even when the internal pressure of the aerosol container changes due to factors such as the external temperature, the atmospheric pressure, the decrease in the remaining amount of the liquid material, etc.

Moreover, the present embodiment may be regarded as a temperature adjusting method for an aerosol container using a temperature adjusting device. The temperature of the aerosol container can be suitably maintained by the temperature adjusting device performing a temperature adjusting step including a cooling step or a heating step.

Here, note that the temperature adjusting device for an aerosol container described in the present embodiment and each of the following embodiments can be used even when the aerosol container is not mounted on an aerial vehicle. That is, the present invention can be applied to various situations where temperature adjustment of the aerosol container is required. The temperature adjusting method described in each of control examples, using the temperature adjusting device described above, can also be used even if the device is not mounted on an aerial vehicle.

Next, other embodiments of the discharge apparatus of the present invention will be described. In the following description, only differences from the above-mentioned embodiments will be mainly described, wherein the same components will be denoted by the same reference signs, and the description thereof will be omitted.

Second Embodiment of Second Invention

FIG. 14 illustrates a discharge apparatus for an aerial vehicle according to a second embodiment of the present invention. The following description will be focused on those which are different from FIG. 12. FIG. 14(A) is a cross-sectional view of the discharge apparatus for an aerial vehicle, and FIG. 14(B) is a view in the direction of an arrow C in FIG. 14(A). Note that FIG. 12 is a side cross-sectional view of a discharge apparatus 1 as seen from its side, but FIG. 14(A) is different therefrom, and is a plan cross-sectional view of the discharge apparatus 1 as seen from above.

In the present embodiment, a temperature adjusting device 500 does not perform heating, but is specialized only for cooling. Therefore, it is suitable for the case where an aerosol container 10 is used in an environment in which the temperature thereof tends to be high, or the case where a content needs to be maintained at a low temperature. The same components as those in the first embodiment are denoted by the same reference signs.

In this embodiment, the cold heat generated by a Peltier element 505, which is a temperature adjusting means, is transferred to the aerosol container 10 through a heat conductive plate 522*b*, a heat pipe 521 and a heat conductive plate 522*a*, and cools the aerosol container 10. The heat pipe is a highly efficient heat transfer device in which a volatile liquid is sealed as a working fluid in a pipe made of a material with high thermal conductivity. For example, copper is used as the material of the pipe, and ethanol, water or the like is used as the working fluid. In the heat pipe, heat is transferred due to the generation of a cycle in which the working fluid evaporates at a high temperature side and condenses at a low temperature side. On the other hand, the warm heat generated from a non-contact surface of the Peltier element 505 that is not in contact with the heat conductive plate 522 is released to the outside by the operation of a heat sink 506 and a fan 507.

Note that a radiator of the heat pipe 521 is preferably located higher than the aerosol container 10, which is a heat source, as shown in FIG. 14(B). With such a configuration, the working fluid in the heat pipe is condensed by the radiator and flows down to the aerosol container by gravity, so that the working fluid is efficiently circulated. In addition, by using the heat conductive plate 522, it is possible to cool the aerosol container 10 without hindering the back and forth movement of the aerosol container 10 even during discharge driving.

Here, note that for the method of temperature control, the same method as in each of the control examples of the first embodiment can be used. As described above, according to the discharge apparatus described in the present embodiment, the temperature of the aerosol container 10 can be lowered even when it becomes high.

Third Embodiment of Second Invention

FIG. 15 illustrates a discharge apparatus for an aerial vehicle according to a third embodiment of the second invention. FIG. 15 is a cross-sectional view of a discharge apparatus for an aerial vehicle.

In the present embodiment, a temperature adjusting device 500 is specialized only for heating without performing cooling. Therefore, it is suitable for use in environments where the temperature of an aerosol container 10 tends to be low, or for the case where a content needs to be maintained at high temperatures. The same components as those in the above-described embodiments are denoted by the same reference signs.

In the present embodiment, the temperature adjusting device 500 includes a film heater 510 (temperature adjusting means). The film heater 510 is connected to an unillustrated power source by electrical wiring, and functions as a heating means that generates heat when a current is applied thereto according to the control of a control means.

The film heater 510 is arranged inside a sleeve 20 so as to be in contact with the aerosol container 10 when the aerosol container 10 is housed therein. When the aerosol container 10 is placed inside the sleeve 20, the film heater 510 may be wound around and fixed to the outer periphery of the container, or the film heater 510 may be formed into a cylindrical shape and fixed to the sleeve 20, and then the aerosol container 10 may be inserted.

The film heater 510 is preferably flexible so as to be compatible with the size and shape of the aerosol container, and for example, a PET film material can be used. In addition, various heaters such as silicon rubber heaters and aluminum sheet heaters can be used according to the required performance and shape. As for the film heater 510, it is preferable that the temperature thereof can be adjusted according to the control of a control means.

Here, note that for the method of temperature control, the same method as in each of the control examples of the first embodiment can be used. As described above, according to the discharge apparatus described in the present embodiment, the temperature of the aerosol container 10 can be raised even when it becomes low.

Fourth Embodiment of Second Invention

FIG. 16 is a side cross-sectional view illustrating a discharge apparatus for an aerial vehicle according to a fourth embodiment of the second invention. (A) shows a state in which a temperature adjusting device is used for heating, and (B) shows a state in which the temperature adjusting device is used for cooling. In the present embodiment, the temperature adjusting device can be used for both heating and cooling by the manual operation of an operator. The same components as those in the above-described embodiments are denoted by the same reference signs.

The temperature adjusting device of the present embodiment is provided with a fixing band 512. The fixing band 512 is arranged on an outer periphery of an aerosol container 10, so that a heat generating unit 511 or a cooling unit 515 (temperature adjusting means), which is a temperature control unit, can be arranged close to the aerosol container 10. In the illustrated example, the fixing band 512 has a plurality of slots, and is wrapped around the outer periphery of the container with the temperature control unit contained in each slot to transfer warm heat or cold heat to the aerosol container 10. As the fixing band, a material such as cloth (fiber), rubber, resin, a combination thereof, or the like, which is flexible and can follow the back and forth movement of the aerosol container, is suitable, but is not limited thereto. In addition, the fixing band is not limited to a fixing means of a band shape, but it is sufficient that the heat of the temperature control unit can be transferred to the aerosol container 10. Slots may be formed in the inside of the sleeve 20 to allow the heat generating unit 511 to be placed and fixed.

Figure 16A:
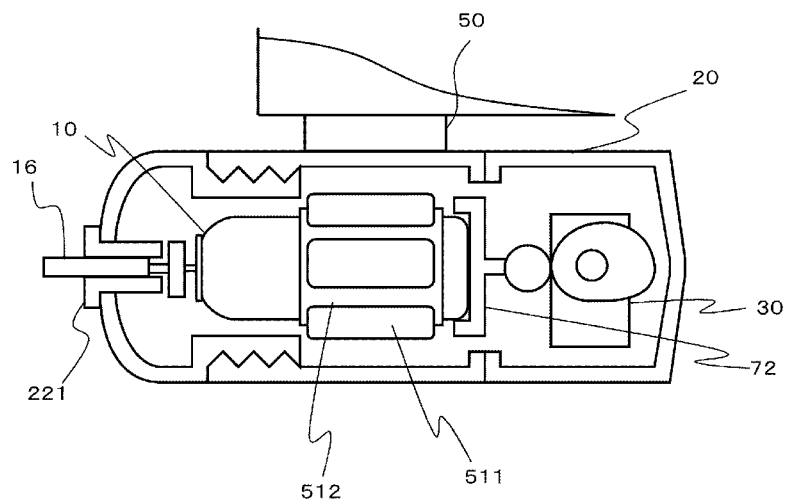
Figure 16B:
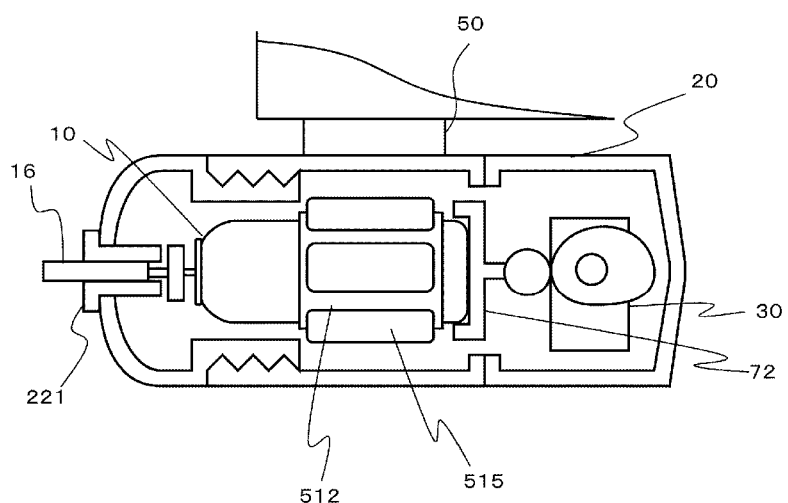

In FIG. 16(A), the heat generating unit 511 is housed or contained in the fixing band 512 as the temperature control unit. As the heat generating unit 511, for example, a portable warmer that generates heat by oxidation of iron can be used. In FIG. 16(B), the cooling unit 515 as the temperature control unit is housed or contained in the fixing band 512. As the cooling unit 515, there can be used, for example, a cooling pack that cools by mixing water and a chemical, a cooling agent containing water and a highly water absorptive resin as main components, a cooling gel sheet using a polymer gel, or the like.

According to the present embodiment, a portable warmer, a cooling pack or the like can be used as the heating means or the cooling means. Therefore, the aerosol container 10 can be heated or cooled at a low cost, and electric wiring is not required, thereby simplifying the mechanism.

Next, a temperature holding device for an aerosol container according to the third present invention will be described in detail based on embodiments illustrated in the drawings.

In the embodiments of this third invention, the configuration of an aerial vehicle itself in a discharge apparatus for an aerial vehicle is as described in the first embodiment of the first invention, and hence the description thereof will be omitted. In the following description, the configuration of the discharge apparatus to which the temperature holding device for an aerosol container is applied will be described. Since the basic configuration of the discharge apparatus is the same as that of the first embodiment of the first invention, only portions different from the first embodiment of the first invention will be mainly described, and the same components will be denoted by the same reference signs and the description thereof will be omitted.

First Embodiment of Third Invention

Figure 17:
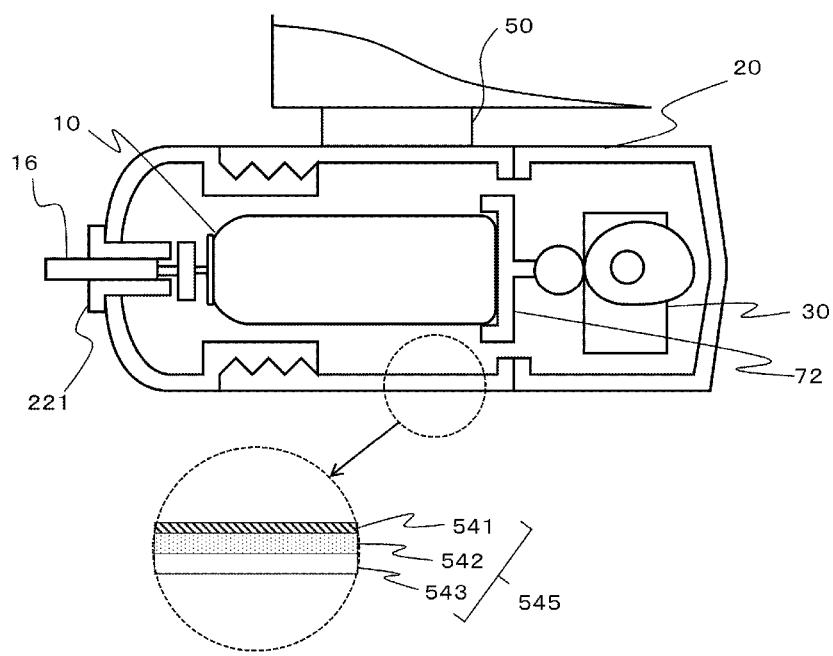

FIG. 17 is a side cross-sectional view illustrating a discharge apparatus for an aerial vehicle according to a first embodiment of the third invention, and conceptually shows a temperature holding device 545 for an aerosol container. In the present embodiment, instead of adjusting the temperature of an aerosol container 10, the discharge performance is maintained by reducing an amount of temperature change.

In FIG. 17, the configuration of a sleeve 20 is different from that of each of the above embodiments. That is, a wall material constituting the sleeve 20 has a three-layer structure, wherein an aluminum vapor deposition layer 541, a heat insulating material 542 (temperature holding means), and an exterior material 543 are laminated in this order from the inside. In this way, the sleeve 20 also functions as the temperature holding device 545. In this configuration, the aluminum vapor deposition layer 541 reflects heat inside the sleeve to prevent the heat (warm heat or cold heat) from escaping to the outside by radiation, and the heat insulating material 542 prevents heat exchange by conduction with the outside. Then, the exterior material 543 maintains its sleeve shape. As the heat insulating material 542, there can be used a variety of heat insulating materials such as a fiber heat insulating material such as glass wool, a resin heat insulating material such as foam, etc.

According to the present embodiment, the temperature change of the aerosol container 10 is suppressed by the configuration of the sleeve 20 itself, which makes it possible to maintain the discharge performance at a low cost.

In addition, the present embodiment may be regarded as a temperature holding method for an aerosol container using a temperature holding device. The temperature holding device performs a temperature holding step to maintain the temperature of the aerosol container at a suitable level.

Modifications

The configuration of the temperature holding device is not limited to the example of FIG. 17.

First, as for the position of arrangement of the heat insulating material, the heat insulating material can be arranged at an inner side or an outer side or both sides of the exterior material. In addition, only either one of a reflective layer such as an aluminum vapor deposition layer and a heat insulating layer such as a heat insulating material may be provided. With the provision of the heat insulating material or the like separately from the sleeve 20 in this way, it is possible to replace only the heat insulating material, for example, when the heat insulating material is deteriorated.

Moreover, the exterior material may be composed of only a heat insulating material. In the case where the exterior material is required to have impact absorption performance rather than strength, the exterior material may be composed solely of a heat insulating material formed of styrene foam or the like. This will protect the aerosol container 10 from impact in the event of a crash. Further, urethane foam or the like may be applied as a material having both strength and heat insulating properties.

Furthermore, the aerosol container 10 may be fitted into a heat insulating material formed of styrene foam or the like. Any other means may be used as long as the influence of external heat on the discharge apparatus can be suppressed.

Second Embodiment of Third Invention

Figure 18:
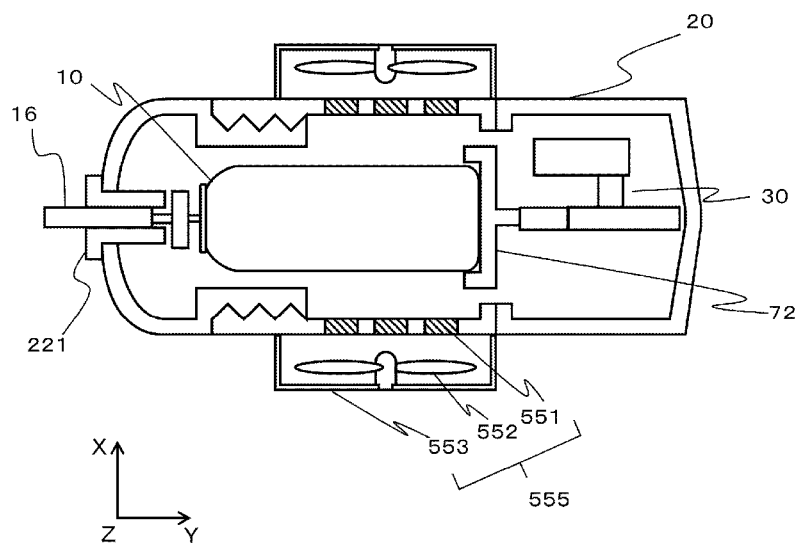

FIG. 18 is a plan sectional view illustrating a discharge apparatus for an aerial vehicle according to a second embodiment of the third invention, and conceptually shows a temperature holding device for an aerosol container. In the present embodiment, the temperature of an aerosol container 10 is maintained at the same level as the outside to maintain the discharge performance. Therefore, the present embodiment is suitable for the case where the temperature of the external environment is stable and it is necessary to efficiently discharge the heat accumulated inside the discharge apparatus. The same components as those in the above-described embodiments are denoted by the same reference signs.

FIG. 18 illustrates the discharge apparatus as viewed from above. A temperature holding device 555 of the present embodiment is arranged on each of both side surfaces of a sleeve 20. The temperature holding device 555 includes vent holes 551 opened in the side surfaces of the sleeve 20, fans 552 (temperature holding means) connected to an unillustrated power supply by electrical wiring and operated according to a command from a control means, and fan cases 553. By operating the fans 552, air exchange between the inside and the outside of the discharge apparatus is promoted, so that the inside air temperature approaches the outside air temperature.

According to the present embodiment, it is possible to stabilize the temperature around the aerosol container 10 in a state close to the outside air temperature. Note that the arrangement and number of fans are not limited to the illustrated example.

Here, note that the temperature holding device for an aerosol container described herein may be utilized even if the aerosol container is not mounted on an aerial vehicle. That is, the present invention can be applied to various situations in which the temperature of the aerosol container is maintained. In addition, the temperature holding method using the temperature holding device can also be used even if the temperature holding device is not mounted on an aerial vehicle.

The stirring device, the temperature adjusting device, and the temperature holding device in each of the embodiments of the first invention, the second invention, and the third invention described above can be used in any combination as long as they do not contradict each other. For example, by using a discharge apparatus that is equipped with both the temperature adjusting device of the second invention and the temperature holding device of the third invention, the temperature can be maintained as much as possible, so that the electricity consumption of the temperature adjusting device can be reduced. In addition, by using a discharge apparatus equipped with the stirring device of the first invention and the temperature holding device of the third invention, the temperature can be maintained while achieving uniform concentration. Further, by using a discharge apparatus that is equipped with both the stirring device of the first invention and the temperature adjusting device of the second invention, the temperature can be adjusted within an appropriate range while making the concentration of the content uniform. Furthermore, if a discharge apparatus is equipped with the stirring device of the first invention, the temperature adjusting device of the second invention, and the temperature holding device of the third invention, the temperature can be adjusted within an appropriate range while making the concentration of the content uniform, so that an appropriate temperature can be maintained as much as possible by means of the temperature holding device.

Figure 19:
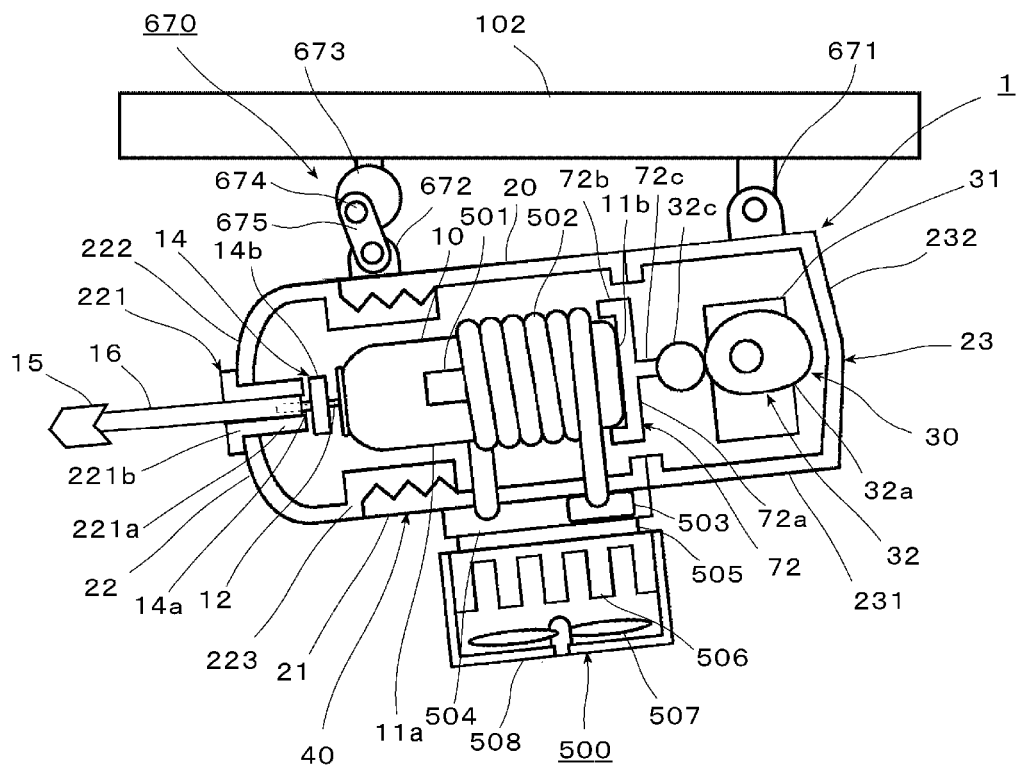

FIG. 19 shows a configuration example in which the stirring device of the sixth embodiment of the first invention and the temperature adjusting device of the first embodiment of the second invention are combined. As combinations, for example, the first embodiment (FIG. 1), the third embodiment (FIGS. 6 and 7), the fourth embodiment (FIG. 7), and/or the fifth embodiment (FIG. 9) of the first invention can also be combined with the temperature adjusting device of the first embodiment of the second invention.

As a heating means, if it is constructed such that the film heater 510, which generates heat due to Joule heat in the third embodiment of the second invention, is wound around the aerosol container 10, or if it is also constructed such that a heating element using the heat of oxidation of iron powder or the like is wound around the aerosol container 10, such a construction can be applied to a configuration in which the aerosol container turns around as in the second embodiment (FIG. 5), the fifth embodiment (FIG. 8), and the seventh embodiment (FIG. 10) of the first invention, and thus various heating means can be selected according to stirring devices.

Here, note that in each of the above-described embodiments, an example has been described in which a multicopter is used as an aerial vehicle on which a liquid material discharge apparatus is mounted, but a discharge apparatus for a moving vehicle of the present invention can be applied to not only a helicopter but also an unmanned aircraft such as a fixed-wing aircraft, an airship, a gliding aircraft, etc., in addition to an aerial vehicle using rotor blades (rotors), and can also be applied to not only an unmanned but also a manned aircraft. Further, the present invention can be widely applied not only to aerial vehicles but also to various types of unmanned or manned moving vehicles such as vehicles traveling on tracks, vehicles traveling on road surfaces, and the like.

REFERENCE SIGNS LIST

1 discharge apparatus
10 aerosol container
11*a* body portion, 11*b* bottom portion, 11*d* mounting cup
12 stem, 12*a* discharge flow passage, 12*b* stem hole
13 valve mechanism
13*a* gasket, 13*b* spring
14 actuator
14*a* main body portion, 14*b* flange portion
15 nozzle, 15*a* injection hole
16 connecting tube
20 sleeve (housing member)
21 sleeve main body
21*a* radial support portion
22 first end cover portion
221 pressing member, 221*a* tubular body, 221*b* end flange portion
222 cover main body, 223 threaded tubular portion
23 second end cover portion
231 tubular portion, 232 end plate
30 discharge drive unit 301 frame
31 motor, 32a cam, 32b movable plate
32c cam follower
30A drive unit, 30B abutment member, 30C external valve
40 aerosol container assembly
50 discharge apparatus support portion
70 stirring device
72 container holding portion, 72a circular plate portion, 72b annular convex portion
72c connecting shaft portion
73 anti-slip material, 74 motor, 74a output shaft
110 flight control unit, 112 flight communication unit
210 discharge apparatus control unit, 211 discharge apparatus power supply
212 discharge apparatus communication unit
120 operation terminal
160 discharge operation terminal, 163 discharge button, 164 stop button
165 stir button, 166 stop button, 167 display
270 stirring device (second embodiment, FIG. 5)
271 motor, 275 power transmission plate
2221 pressing portion
2221a tubular body, 2221b inward flange portion
M rotation center axis
N container central axis
370 stirring device (third embodiment, FIG. 6)
371 movable frame, 372 motor
373 cam mechanism, 373a cam, 373b cam follower
374 container holding portion
330 discharge drive unit (modification of third embodiment, FIG. 7) θ1 rotation angle (FIG. 7(D)), θ3 rotation angle (FIG. 7(C)) O origin position, θ4 swing angle (fourth embodiment, FIG. 8)
570 stirring device (fifth embodiment, FIG. 9)
572 ultrasonic vibrator, 574 tubular portion
670 stirring device (sixth embodiment, FIG. 10)
671 fixed fulcrum, 672 movable fulcrum, 673 drive plate
674 eccentric shaft, 675 link
278 weight (seventh embodiment, FIG. 11)
100 aerial vehicle
101 airframe, 102 airframe fuselage, 103 arm portion
104 rotor blade, 105 motor, 106 camera, 107 leg portion
500: temperature adjusting device, 501: temperature sensor, 502: heat medium pipe,
503: heat medium pump, 504: reservoir, 505: Peltier element, 506: heat sink, 507: fan, 508: housing
510: film heater, 511: heat generating unit, 512: fixing band, 515: cooling unit, 521: heat pipe, 522: heat conducting plate
541: aluminum vapor deposition layer, 542: heat insulating material, 543: exterior material, 545: temperature holding device, 551: vent hole, 552: fan, 553: fan case, 555: temperature holding device

The invention claimed is:

1. A stirring device for an aerosol container comprising a stirring means configured to stir a content in the aerosol container, wherein the stirring device is applied to the aerosol container mounted on a moving vehicle,
   the stirring means moves the aerosol container with respect to the moving vehicle to stir the content,
   the aerosol container is replaceable while housed in a sleeve, and the aerosol container is supported within the sleeve, and,
   the stirring means is configured to stir the content in the aerosol container by reciprocating the aerosol container.

2. A stirring device for an aerosol container according to claim 1, wherein the aerosol container is mounted on the moving vehicle in a state of being housed in the sleeve.

3. The stirring device for an aerosol container according to claim 1, further comprising a drive means configured to drive a discharge drive unit of the aerosol container.

4. The stirring device for an aerosol container according to claim 1, further comprising a heating means configured to heat the aerosol container.

5. The stirring device for an aerosol container according to claim 1, wherein the stirring means configured to stir the content in the aerosol container by rotating the aerosol container around a container center axis of the aerosol container.

6. The stirring device for an aerosol container according to claim 1, wherein the stirring means is configured to stir the content in the aerosol container by rotating the aerosol container around a rotation center axis eccentric to a container center axis of the aerosol container.

7. A stirring device for an aerosol container comprising a stirring means configured to stir a content in the aerosol container, wherein the stirring device is applied to the aerosol container mounted on a moving vehicle,
   the stirring means moves the aerosol container with respect to the moving vehicle to stir the content,
   the aerosol container is replaceable while housed in a sleeve, and the aerosol container is supported within the sleeve, and
   the stirring means is configured to stir the content in the aerosol container by swinging the aerosol container.

8. A stirring device for an aerosol container comprising a stirring means configured to stir a content in the aerosol container, wherein the stirring device is applied to the aerosol container mounted on a moving vehicle,
   the stirring means moves the aerosol container with respect to the moving vehicle to stir the content,
   the aerosol container is replaceable while housed in a sleeve, and the aerosol container is supported within the sleeve, and
   the stirring means is configured to vibrate and stir the content in the aerosol container by vibrating the aerosol container with a vibrator.

* * * * *